US010970877B2

(12) United States Patent
Eshima et al.

(10) Patent No.: US 10,970,877 B2
(45) Date of Patent: Apr. 6, 2021

(54) IMAGE PROCESSING APPARATUS, IMAGE PROCESSING METHOD, AND PROGRAM

(71) Applicant: Sony Corporation, Tokyo (JP)

(72) Inventors: Masashi Eshima, Chiba (JP); Akihiko Kaino, Kanagawa (JP); Takaaki Kato, Tokyo (JP); Shingo Tsurumi, Saitama (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 15/762,206

(22) PCT Filed: Sep. 16, 2016

(86) PCT No.: PCT/JP2016/077399
§ 371 (c)(1),
(2) Date: Mar. 22, 2018

(87) PCT Pub. No.: WO2017/057043
PCT Pub. Date: Apr. 6, 2017

(65) Prior Publication Data
US 2018/0300898 A1     Oct. 18, 2018

(30) Foreign Application Priority Data

Sep. 30, 2015 (JP) .............................. JP2015-194135

(51) Int. Cl.
*G06T 7/80* (2017.01)
*H04N 13/207* (2018.01)
(Continued)

(52) U.S. Cl.
CPC ................ *G06T 7/80* (2017.01); *G01C 3/18* (2013.01); *G01C 21/005* (2013.01); *G01C 25/00* (2013.01);
(Continued)

(58) Field of Classification Search
CPC ....................................................... G06T 7/80
See application file for complete search history.

(56) References Cited

U.S. PATENT DOCUMENTS 5,499,306 A * 3/1996 Sasaki .................... B25J 9/1697
382/153
6,721,444 B1 * 4/2004 Gu ........................ B25J 9/1697
345/419
(Continued)

FOREIGN PATENT DOCUMENTS

EP     2 624 575 A1    8/2013
JP     10-341458 A    12/1998
(Continued)

OTHER PUBLICATIONS

Written Opinion and English translation thereof dated Dec. 6, 2016 in connection with International Application No. PCT/JP2016/077399.

(Continued)

*Primary Examiner* — Paulos M Natnael
(74) *Attorney, Agent, or Firm* — Wolf, Greenfield & Sacks, P.C.

(57) ABSTRACT

An image processing apparatus, an image processing method, and a program that permit camera calibration with high accuracy by using a known object in images captured by a plurality of imaging sections. An estimation section estimates a 3D position of a road sign included in each of images captured by a plurality of cameras with respect to each of the imaging sections. A recognition section recognizes a positional relationship between the plurality of cameras on the basis of the 3D position of the road sign with respect to each of the cameras estimated by the estimation section. The positional relationship between the plurality of
(Continued)

cameras recognized by the recognition section is used to correct the images captured by the plurality of cameras.

6 Claims, 17 Drawing Sheets

(51) Int. Cl.
| | |
|---|---|
| *H04N 13/243* | (2018.01) |
| *H04N 13/246* | (2018.01) |
| *G01C 25/00* | (2006.01) |
| *G01C 21/00* | (2006.01) |
| *G01C 3/18* | (2006.01) |
| *H04N 17/00* | (2006.01) |
| *G06T 7/73* | (2017.01) |
| *G01S 17/931* | (2020.01) |
| *G06T 7/579* | (2017.01) |
| *G06T 7/593* | (2017.01) |
| *H04N 5/247* | (2006.01) |

(52) U.S. Cl.
CPC .............. *G06T 7/74* (2017.01); *G06T 7/85* (2017.01); *H04N 13/207* (2018.05); *H04N 13/243* (2018.05); *H04N 13/246* (2018.05); *H04N 17/002* (2013.01); *G01S 17/931* (2020.01); *G06T 7/579* (2017.01); *G06T 7/593* (2017.01); *G06T 2207/10012* (2013.01); *G06T 2207/30252* (2013.01); *H04N 5/247* (2013.01)

(56) References Cited

U.S. PATENT DOCUMENTS

| | | | | |
|---|---|---|---|---|
| 7,423,666 | B2* | 9/2008 | Sakakibara | G01B 11/24 345/420 |
| 7,616,886 | B2* | 11/2009 | Matsumura | G03B 15/06 348/142 |
| 8,260,567 | B1* | 9/2012 | Kaplan | G01S 5/16 250/393 |
| 8,773,508 | B2* | 7/2014 | Daniel | G06T 7/55 348/42 |
| 8,805,021 | B2* | 8/2014 | Hwang | G06K 9/00228 382/106 |
| 9,189,711 | B2* | 11/2015 | Duke | B41J 29/393 |
| 9,196,039 | B2* | 11/2015 | MacMillan | G06T 3/0068 |
| 9,584,801 | B2* | 2/2017 | Sugimoto | H04N 17/002 |
| 9,679,196 | B2* | 6/2017 | Shima | H04N 5/2353 |
| 9,734,419 | B1* | 8/2017 | Ye | G06T 7/85 |
| 9,769,469 | B2* | 9/2017 | Ooi | G06T 7/0002 |
| 9,877,012 | B2* | 1/2018 | Uchiyama | G06T 7/593 |
| 10,212,324 | B2* | 2/2019 | Uchiyama | G01S 3/00 |
| 10,277,832 | B2* | 4/2019 | Matsunobu | H04N 5/247 |
| 2003/0038801 | A1* | 2/2003 | Terauchi | G06T 1/0007 345/420 |
| 2007/0008340 | A1* | 1/2007 | Endo | G06T 19/006 345/633 |
| 2011/0243452 | A1 | 10/2011 | Sakaguchi et al. | |
| 2013/0147948 | A1* | 6/2013 | Higuchi | H04N 13/0246 348/135 |
| 2013/0321624 | A1* | 12/2013 | Li | G06K 9/00771 348/143 |
| 2014/0067317 | A1* | 3/2014 | Kobayashi | G05D 3/00 702/153 |
| 2018/0274915 | A1 | 9/2018 | Tsurumi et al. | |
| 2018/0286056 | A1 | 10/2018 | Kaino et al. | |
| 2018/0288401 | A1 | 10/2018 | Eshima et al. | |

FOREIGN PATENT DOCUMENTS

| | | |
|---|---|---|
| JP | 2003-065736 A | 3/2003 |
| JP | 2007-085937 A | 4/2007 |
| JP | 2008-292278 A | 12/2008 |
| JP | 2012-075060 A | 4/2012 |

OTHER PUBLICATIONS

International Preliminary Report on Patentability and English translation thereof dated Apr. 12, 2018 in connection with International Application No. PCT/JP2016/077399.

International Search Report and English translation thereof dated Dec. 6, 2016 in connection with International Application No. PCT/JP2016/077399.

* cited by examiner

IMAGE PROCESSING APPARATUS, IMAGE PROCESSING METHOD, AND PROGRAM

TECHNICAL FIELD

The present disclosure relates to an image processing apparatus, an image processing method, and a program, and more particularly, to an image processing apparatus, an image processing method, and a program that permit camera calibration with high accuracy by using a known object in images captured by a plurality of imaging sections.

BACKGROUND ART

In image processing carried out by linking images captured by a plurality of cameras, it is important to control, with high accuracy, relationships between three dimensional (3D) positions and orientations (attitudes) of the cameras. Also, the relationships between 3D positions and orientations of the cameras change depending on impact, temperature, lapse of time, and so on. Therefore, control parameters of these relationships need to be updated regularly.

Correction of images captured by cameras is known as an approach to controlling relationships between 3D positions and orientations of cameras such that given relationships are present. As an approach to determining parameters used for image correction, i.e., a camera calibration method, for example, correction parameters are found such that desired images are produced as a result of capture of a specific pattern with the respective cameras. This method requires shooting of a specific pattern, making it difficult to update the parameters regularly.

For this reason, there is proposed a method of determining parameters such that similarity of a known object in each image is enhanced by using images captured by a plurality of cameras under normal use without using a specific pattern (refer, for example, to PTL 1). This method permits determination of parameters under normal use, thereby allowing for regular updating of the parameters. Also, there is conceived a method of determining parameters by shooting an arbitrary scene.

CITATION LIST

Patent Literature

[PTL 1]
JP 2012-75060A

SUMMARY

Technical Problem

However, the above method that does not use a specific pattern is readily affected by a shooting environment and so on, making it impossible to calibrate cameras with sufficient accuracy.

The present disclosure has been devised in light of the above problem, and it is an object of the present disclosure to perform camera calibration with high accuracy by using a known object in images captured by a plurality of imaging sections.

Solution to Problem

An image processing apparatus of an aspect of the present disclosure includes an estimation section, a recognition section, and a correction section. The estimation section estimates a 3D position of a known object included in each of images captured by a plurality of imaging sections with respect to each of the imaging sections. The recognition section recognizes a positional relationship between the plurality of imaging sections on the basis of the 3D position of the known object with respect to each of the imaging sections estimated by the estimation section. The correction section corrects the images captured by the plurality of imaging sections on the basis of the positional relationship recognized by the recognition section.

An image processing method and a program of an aspect of the present disclosure are associated with the image processing apparatus of an aspect of the present disclosure.

In an aspect of the present disclosure, a 3D position of a known object included in each of images captured by a plurality of imaging sections is estimated with respect to each of the imaging sections, a positional relationship is recognized between the plurality of imaging sections on the basis of the 3D position of the known object with respect to each of the imaging sections estimated by the estimation section, and the images captured by the plurality of imaging sections are corrected on the basis of the recognized positional relationship.

Advantageous Effects of Invention

According to an aspect of the present disclosure, image processing can be performed. Also, according to the aspect of the present disclosure, it is possible to perform camera calibration with high accuracy by using a known object in images captured by a plurality of imaging sections.

It should be noted that the effects described herein are not necessarily limited and may be any one of the effects described in the present disclosure.

DESCRIPTION OF EMBODIMENTS

Figure 16:
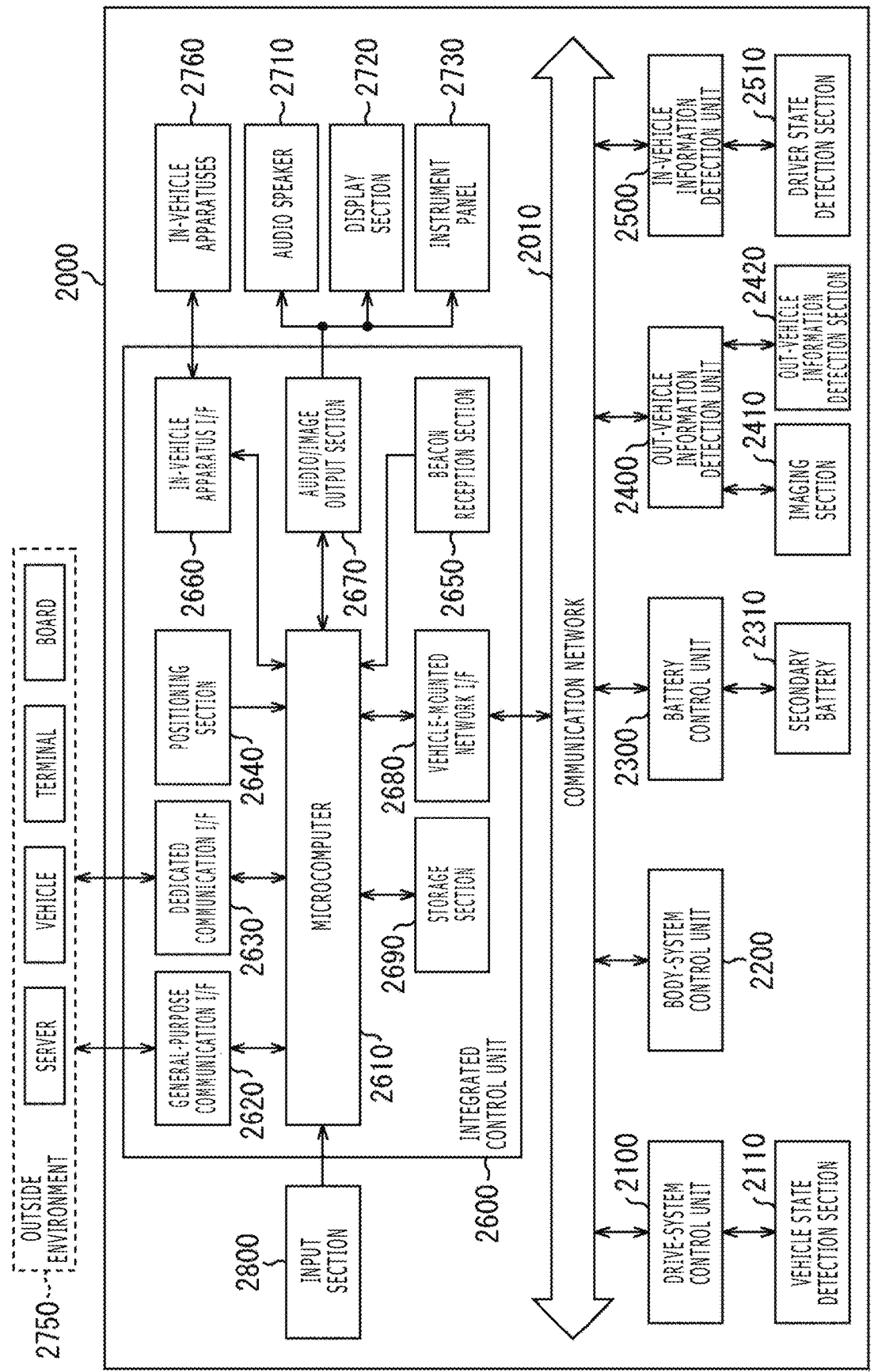
FIG. 16 is a block diagram illustrating an example of a schematic configuration of a vehicle control system.
Figure 17:
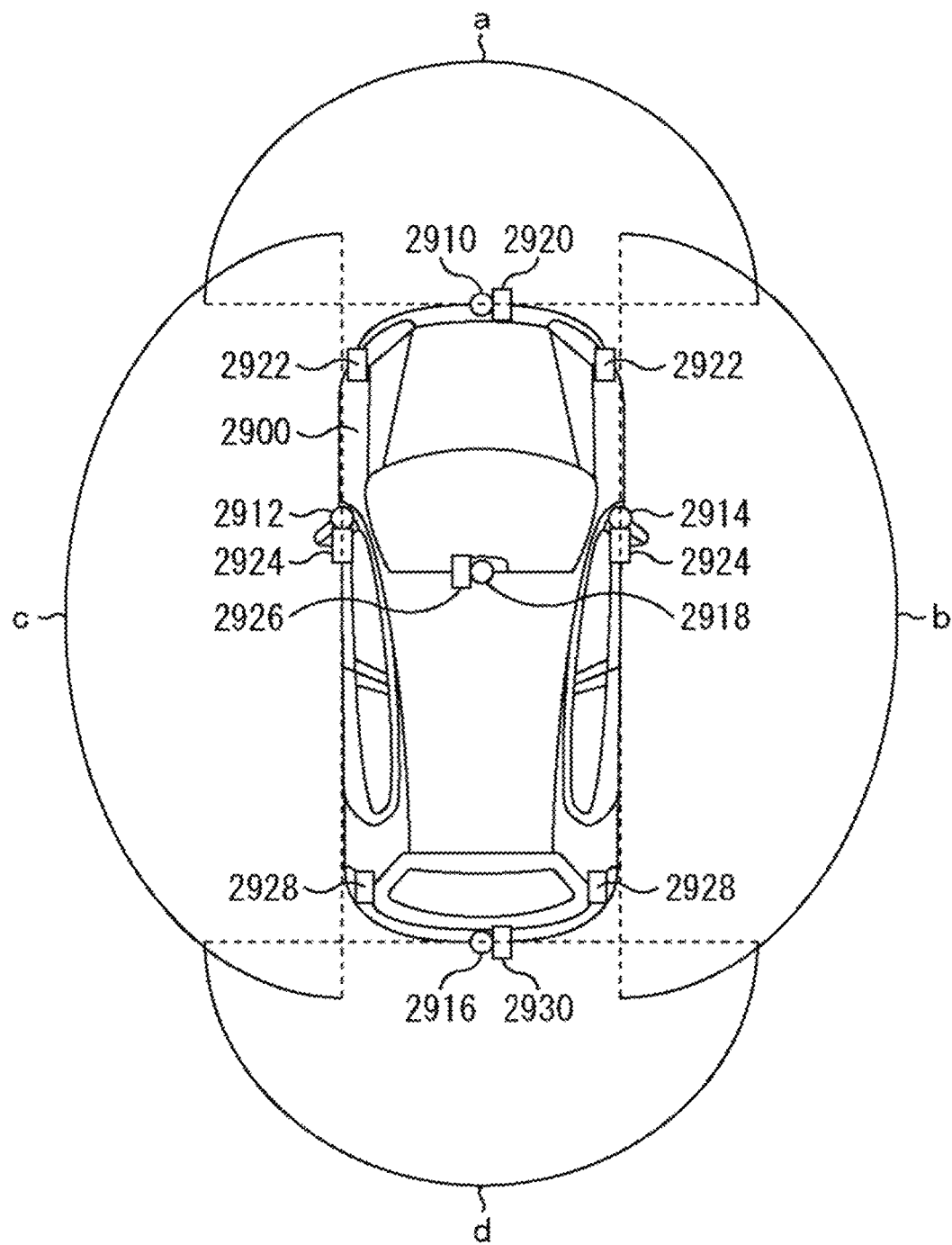
FIG. 17 is an explanatory diagram illustrating examples of installation positions of an out-vehicle information detection section and an imaging section.

A description will be given below of modes for carrying out the present disclosure (hereinafter referred to as embodiments). It should be noted that a description will be given in the following order:
1. First Embodiment: Vehicle-Mounted Camera System (FIG. 1 to FIG. 7)
2. Second Embodiment: Vehicle-Mounted Camera System (FIGS. 8 and 9)
3. Third Embodiment: Vehicle-Mounted Camera System (FIG. 10)
4. Fourth Embodiment: Vehicle-Mounted Camera System (FIG. 11 to FIG. 13)
5. Fifth Embodiment: Vehicle-Mounted Camera System (FIG. 14)
6. Sixth Embodiment: Computer (FIG. 15)
7. Seventh Embodiment: Vehicle Control System (FIGS. 16 and 17)

First Embodiment

Overview of First Embodiment of Vehicle-Mounted Camera System)

Figure 1:
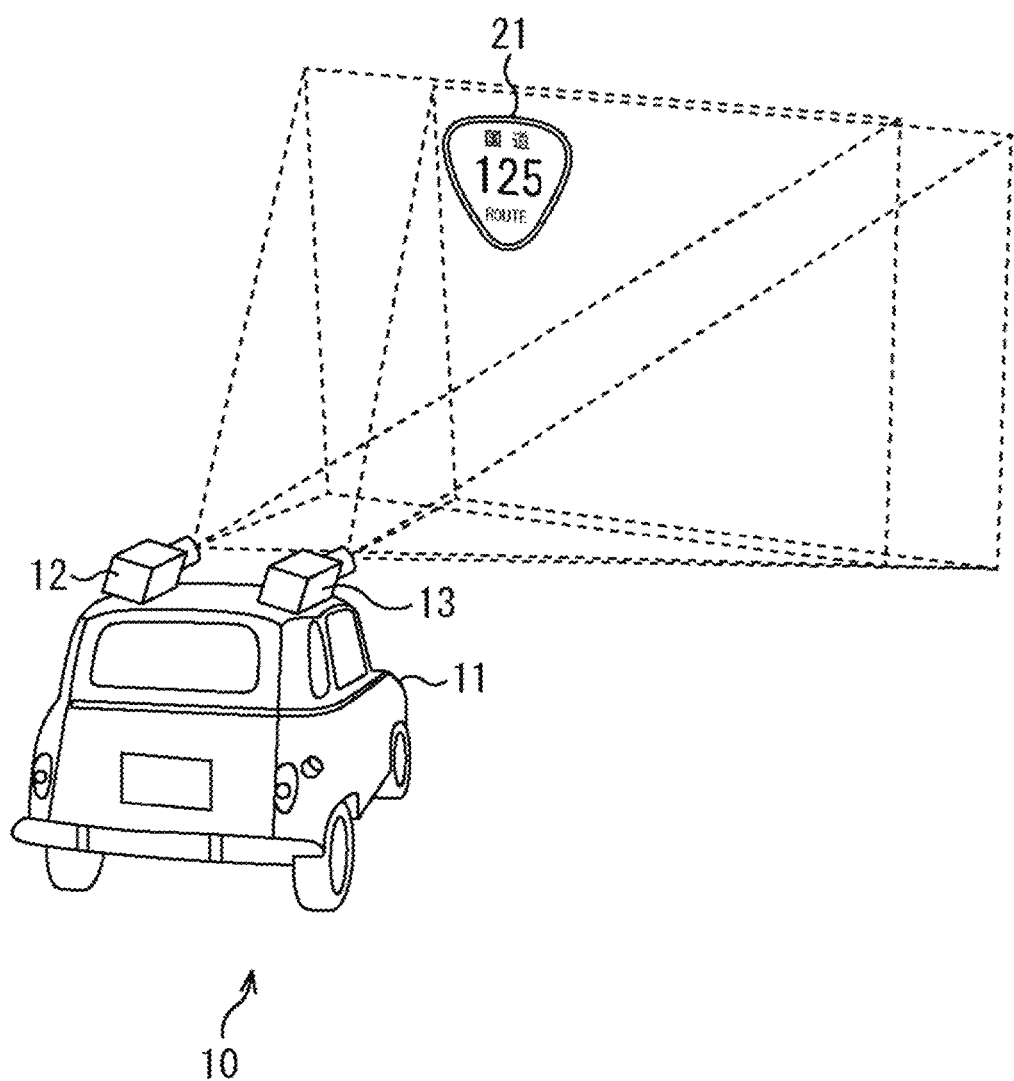
FIG. 1 is a diagram illustrating an overview of a first embodiment of a vehicle-mounted camera system to which the present disclosure is applied.

FIG. 1 is a diagram illustrating an overview of a first embodiment of a vehicle-mounted camera system to which the present disclosure is applied.

A vehicle-mounted camera system 10 depicted in FIG. 1 includes a vehicle 11, cameras 12 and 13, and so on. It should be noted that, in the present specification, front, back, right, and left as one faces the direction of travel of the vehicle 11 during normal driving will be referred to as front, back, right, and left of the vehicle 11.

The camera 12 (first imaging section) and the camera 13 (second imaging section) are mounted to a roof front of the vehicle 11 such that imaging regions overlap. In the example depicted in FIG. 1, a road sign 21, a known object ahead of the vehicle 11, is included in the imaging regions of the cameras 12 and 13.

Although the road sign 21 is a known object in the first embodiment, a known object may be an object on the road other than a road sign or an object of the vehicle 11 such as number plate and emblem as long as it is an object of known size and shape.

The image processing apparatus, not depicted, which is mounted to the vehicle 11 estimates 3D positions and orientations of the road sign 21 with respect to each of the cameras 12 and 13.

It should be noted that the 3D position with respect to the camera 12 (camera 13) is, for example, a position in x, y, and z directions when a given position (e.g., center) of an imaging plane of the camera 12 (camera 13) is assumed to be an origin and when horizontal and vertical directions of the imaging plane thereof and the direction vertical to the imaging plane are assumed to be the x, y, and z directions, respectively. Also, the orientation with respect to the camera 12 (camera 13) is a rotation angle about these x, y, and z directions.

The image processing apparatus recognizes relationships between 3D positions and orientations of the cameras 12 and 13 on the basis of the 3D positions and orientations of the road sign 21 with respect to each of the cameras 12 and 13, and performs calibration of the cameras 12 and 13 on the basis of these relationships.

The relationship between 3D positions of the cameras 12 and 13 refers, for example, to a position of a given position of the imaging plane of the other of the cameras 12 and 13 in the x, y, and z directions when a given position (e.g., center) of the imaging plane of one of the cameras 12 and 13 is assumed to be the origin and when the horizontal and vertical directions of the imaging plane thereof and the direction vertical to the imaging plane are assumed to be the x, y, and z directions, respectively. Also, the relationship between orientations of the cameras 12 and 13 refers, for example, to a rotation angle of the imaging plane of the other of the cameras 12 and 13 about these x, y, and z directions.

Configuration Example of Image Processing Apparatus

Figure 2:
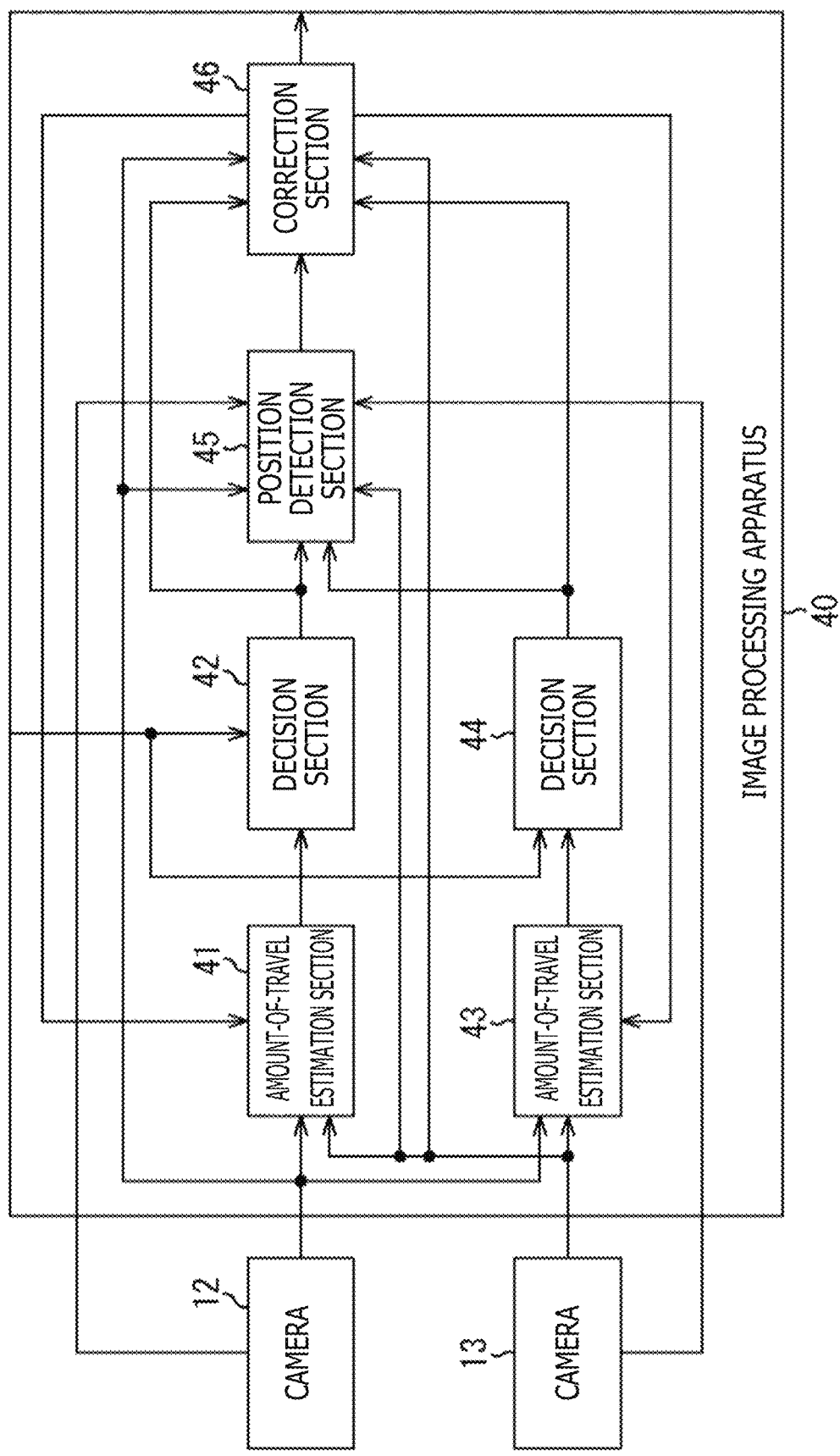
FIG. 2 is a block diagram illustrating a configuration example of an image processing apparatus mounted to a vehicle depicted in FIG. 1.

FIG. 2 is a block diagram illustrating a configuration example of the image processing apparatus mounted to the vehicle 11 depicted in FIG. 1.

An image processing apparatus 40 depicted in FIG. 2 includes an amount-of-travel estimation section 41, a decision section 42, an amount-of-travel estimation section 43, a decision section 44, a position detection section 45, and a correction section 46.

Images captured by the cameras 12 and 13 are input to the image processing apparatus 40. Images captured by the camera 12 are supplied to the amount-of-travel estimation section 41, the amount-of-travel estimation section 43, the position detection section 45, and the correction section 46, and images captured by the camera 13 are supplied to the amount-of-travel estimation section 41, the amount-of-travel estimation section 43, the position detection section 45, and the correction section 46. Also, imaging parameters are input to the image processing apparatus 40 from the cameras 12 and 13 and supplied to the position detection section 45.

It should be noted that imaging parameters are, for example, internal parameters such as horizontal and vertical magnifying ratios on the basis of focal distance, pixel size, and so on that are used when a position on an image is converted into a position in the 3D space of the real world. Details of internal parameters are described, for example, in PTL 1.

The amount-of-travel estimation section 41 of the image processing apparatus 40 estimates, using images at different times (frames) supplied from the camera 12, amounts of travel of the 3D position and orientation of the camera 12 between those times and supplies the amounts of travel to the decision section 42.

The decision section 42 decides whether or not it is necessary to calibrate the camera 12 on the basis of the amounts of travel supplied from the amount-of-travel estimation section 41 and a speed of the vehicle 11 measured by a speedometer, not depicted, which is mounted to the vehicle 11. The decision section 42 supplies a decision result to the position detection section 45 and the correction section 46.

The amount-of-travel estimation section 43 estimates, using images at different times (frames) supplied from the camera 13, amounts of travel of the 3D position and orientation of the camera 13 during those times and supplies the amounts of travel to the decision section 44.

The decision section 44 decides whether or not it is necessary to calibrate the camera 13 on the basis of the amounts of travel supplied from the amount-of-travel estimation section 43 and a speed of the vehicle 11 measured by a speedometer, not depicted, which is mounted to the vehicle 11. The decision section 44 supplies a decision result to the position detection section 45 and the correction section 46.

In a case where calibration is necessary according to the decision result supplied from at least one of the decision section 42 and the decision section 44, the position detection section 45 detects the road sign 21 as a common known object included in the images supplied from the cameras 12 and 13.

Then, the position detection section 45 estimates the 3D positions and orientations of the road sign 21 with respect to each of the cameras 12 and 13, on the basis of the imaging parameters supplied from each of the cameras 12 and 13. The position detection section 45 recognizes the relationships between 3D positions and orientations of the cameras 12 and 13 on the basis of these 3D position and orientation. The position detection section 45 supplies these relationships to the correction section 46.

The correction section 46 determines correction parameters used to correct images of at least one of the cameras 12 and 13 on the basis of the relationships between the cameras 12 and 13 supplied from the position detection section 45 and the decision results supplied from the decision section 42 and the decision section 44 and retains (updates) the correction parameters. The correction section 46 corrects the images supplied from the cameras 12 and 13 using the retained correction parameters and outputs the corrected images. Also, the retained correction parameter for the camera 12 is read by the amount-of-travel estimation section 41 and used to estimate the amount of travel of the camera 12. The retained correction parameter for the camera 13 is read by the amount-of-travel estimation section 43 and used to estimate the amount of travel of the camera 13.

The correction parameters can be determined, for example, such that the orientations of the cameras 12 and 13 and the positions thereof in the y and z directions are the same. In this case, the images captured by the cameras 12 and 13 are parallel to each other as a result of correction by the correction section 46.

Configuration Example of Amount-of-Travel Estimation Section

Figure 3:
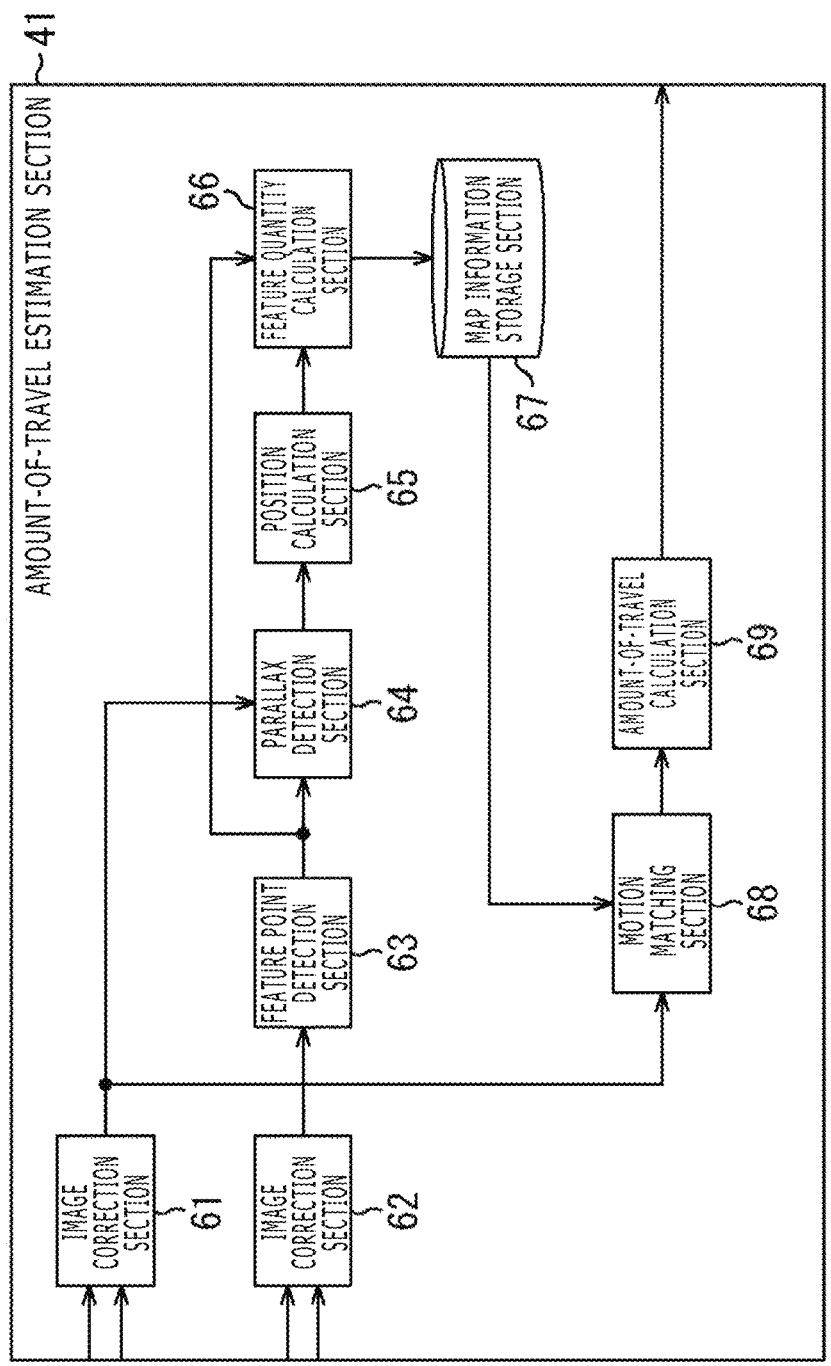
FIG. 3 is a block diagram illustrating a configuration example of an amount-of-travel estimation section depicted in FIG. 2.

FIG. 3 is a block diagram illustrating a configuration example of the amount-of-travel estimation section 41 depicted in FIG. 2.

The amount-of-travel estimation section 41 includes an image correction section 61, an image correction section 62, a feature point detection section 63, a parallax detection section 64, a position calculation section 65, a feature quantity calculation section 66, a map information storage section 67, a motion matching section 68, and an amount-of-travel calculation section 69.

The image correction section 61 corrects an image supplied from the camera 12 on the basis of the correction parameter for the camera 12 retained by the correction section 46 depicted in FIG. 2 such that the image faces the same direction as the image supplied from the camera 13. The image correction section 61 supplies the corrected image to the parallax detection section 64 and the motion matching section 68 as a left image.

The image correction section 62 corrects an image supplied from the camera 13 on the basis of the correction parameter for the camera 13 retained by the correction section 46 depicted in FIG. 2 such that the image faces the same direction as the image supplied from the camera 12. The image correction section 62 supplies the corrected image to the feature point detection section 63 as a right image.

The feature point detection section 63 detects feature points of the right image supplied from the image correction section 62. The feature point detection section 63 supplies, to the parallax detection section 64 and the feature quantity calculation section 66, right feature point position information indicating the position of each feature point detected on the right image and the right image.

The parallax detection section 64 detects, from the left image supplied from the image correction section 61, feature points, each corresponding to one of feature points of the right image, on the basis of right feature point position information and the right image supplied from the feature point detection section 63. The parallax detection section 64 supplies, to the position calculation section 65, left feature point position information indicating the position of each feature point detected on the left image and the right feature point position information. Also, the parallax detection section 64 detects, for each feature point, a difference between the position indicated by the right feature point position information and the position indicated by the left feature point position information as a stereo parallax and supplies the stereo parallax of each feature point to the position calculation section 65.

The position calculation section 65 calculates the position of each feature point in the 3D space of the real world on the basis of the stereo parallaxes supplied from the parallax detection section 64, the right feature point position information, and the left feature point position information. The position calculation section 65 supplies, to the feature quantity calculation section 66, 3D position information indicating the position of each feature point in the 3D space of the real world.

The feature quantity calculation section 66 calculates a feature quantity of each feature point on the basis of the right feature point position information and the right image supplied from the feature point detection section 63. The feature quantity calculation section 66 stores feature point information including 3D position information and the feature quantity of each feature point in the map information storage section 67.

The motion matching section 68 reads, from the map information storage section 67, feature point information of each feature point detected from the past left and right images. The motion matching section 68 detects, on the basis of the feature quantity of each feature point included in the read feature point information and from the current left image supplied from the image correction section 61, a feature point that corresponds to that feature point. The motion matching section 68 supplies, to the amount-of-travel calculation section 69, 3D position information of each feature point included in the read feature point information and left feature point position information for that feature point.

The amount-of-travel calculation section 69 estimates, on the basis of 3D position information of each past feature point supplied from the motion matching section 68 and left feature point position information of the current feature point that corresponds to that feature point, frame-to-frame amounts of travel of the 3D position and orientation of the camera 12. The amount-of-travel calculation section 69 supplies the estimated amounts of travel to the decision section 42 depicted in FIG. 2.

It should be noted that although the amount-of-travel estimation section 41 depicted in FIG. 3 calculated the 3D position of each feature point on the basis of the stereo parallax, the 3D position of each feature point may be calculated on the basis of a movement parallax. In this case, the parallax detection section 64 detects a movement parallax of each feature point of the left image (right image) using left images (right images) at different times. Then, the position calculation section 65 calculates the 3D position of each feature point on the basis of the movement parallax detected by the parallax detection section 64 and the left feature point position information (right feature point position information).

Also, although not depicted, the amount-of-travel estimation section 43 has the similar configuration as the amount-of-travel estimation section 41 depicted in FIG. 3 except that the right image is input to the motion matching section 68 rather than the left image. It should be noted that, here, both the amount-of-travel estimation section 41 and the decision section 42 and both the amount-of-travel estimation section 43 and the decision section 44 are provided separately so that the need for calibration of the cameras 12 and 13 is decided separately. However, in a case where the amount-of-travel estimation section 41 is configured as depicted in FIG. 3, the decision results as to the need for calibration of the cameras 12 and 13 are the same. Therefore, only the amount-of-travel estimation section 41 and the decision section 42 may be provided. In this case, the decision section 42 decides whether or not it is necessary to calibrate both the cameras 12 and 13 on the basis of the amounts of travel supplied from the amount-of-travel estimation section 41 and the speed of the vehicle 11 measured by the speedometer, not depicted, which is mounted to the vehicle 11. Also, the amount-of-travel estimation section 41 may estimate amounts of travel using movement parallax rather than stereo parallax. In this case, both the amount-of-travel estimation section 41 and the decision section 42 and both the amount-of-travel estimation section 43 and the decision section 44 are provided separately, and whether or not it is necessary to calibrate the cameras 12 and 13 is decided separately.

Configuration Example of Position Detection Section

Figure 4:
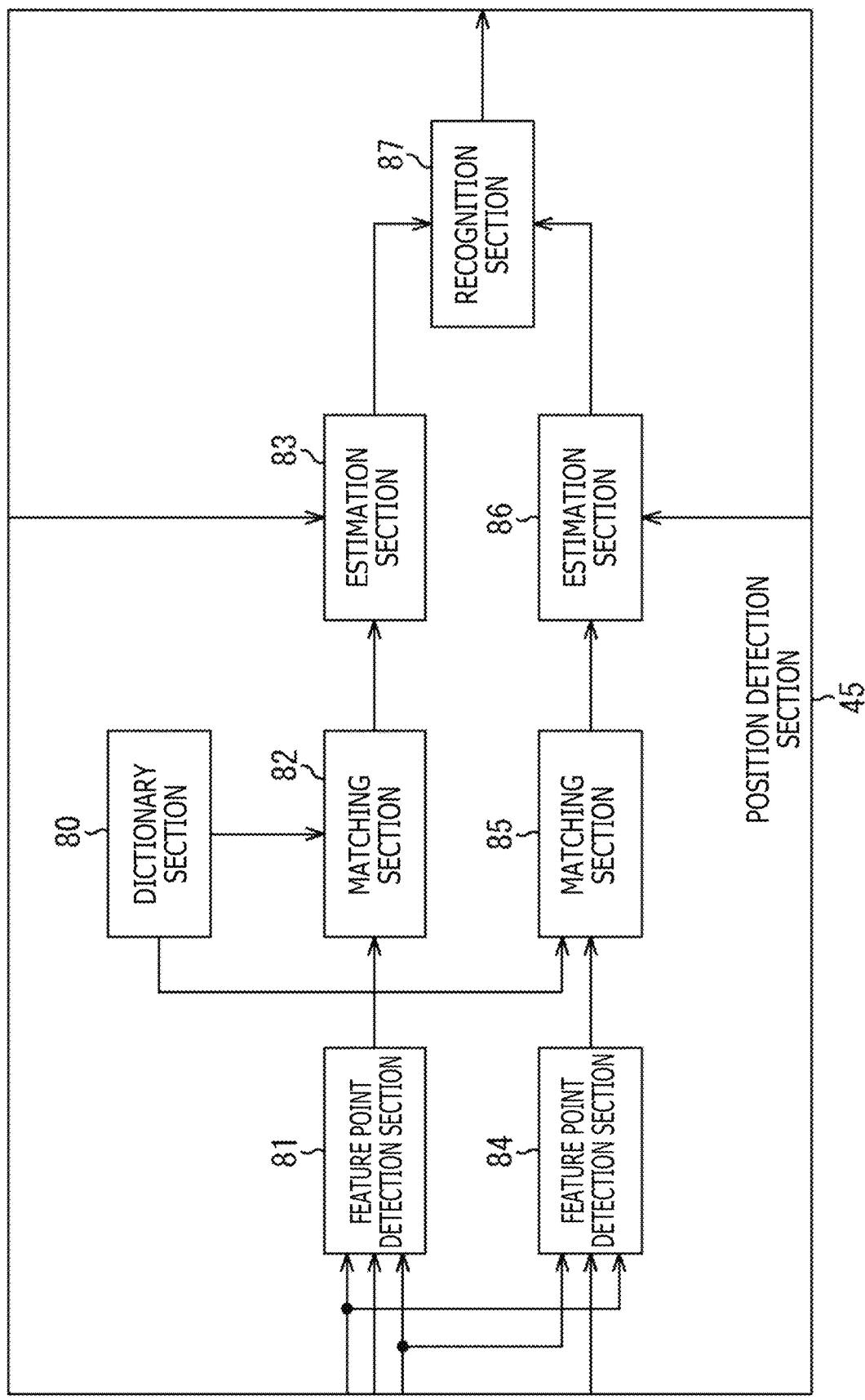
FIG. 4 is a block diagram illustrating a configuration example of a position detection section depicted in FIG. 2.

FIG. 4 is a block diagram illustrating a configuration example of the position detection section 45 depicted in FIG. 2.

The position detection section 45 depicted in FIG. 4 includes a dictionary section 80, a feature point detection section 81, a matching section 82, an estimation section 83, a feature point detection section 84, a matching section 85, an estimation section 86, and a recognition section 87.

The dictionary section 80 retains feature quantities of a plurality of feature points of the road sign 21, a known object.

The feature point detection section 81 detects feature points from the image supplied from the camera 12 for use as feature point candidates of a known object in response to decision results supplied from the decision sections 42 and 44 depicted in FIG. 2. The feature point detection section 81 supplies feature quantities of the feature point candidates of the known object and two dimensional (2D) positions on the image to the matching section 82.

The matching section 82 reads the feature quantities of the plurality of feature points of the road sign 21 from the dictionary section 80. The matching section 82 performs matching, for each read feature point of the road sign 21, between the feature quantity of that feature point and the feature quantity of the feature point candidate supplied from the feature point detection section 81, selecting the feature point candidate with the highest similarity, as a feature point of the road sign 21. The matching section 82 supplies, to the estimation section 83, the 2D position of the selected feature point of the road sign 21 on the image.

It should be noted, however, that if, for example, the highest similarity of a given number of feature points or more of the feature points of the road sign 21 is equal to a threshold or less, the matching section 82 decides that the road sign 21 does not exist in the image supplied from the camera 12 and does not supply anything to the estimation section 83.

The estimation section 83 finds a 3D position of each feature point of the road sign 21 with respect to the camera 12 on the basis of the 2D position of each feature point of the road sign 21 on the image supplied from the matching section 82 and the imaging parameters supplied from the camera 12. The estimation section 83 estimates the 3D position and orientation of the road sign 21 with respect to the camera 12 on the basis of the 3D position of each of the feature points of the road sign 21 with respect to the camera 12 and supplies the 3D position and orientation to the recognition section 87.

The feature point detection section 84 detects feature points from the image supplied from the camera 13 for use as feature point candidates of a known object in response to decision results supplied from the decision sections 42 and 44 depicted in FIG. 2. The feature point detection section 84 supplies feature quantities of the feature point candidates of the known object and 2D positions on the image to the matching section 85.

The matching section 85 reads the feature quantities of the plurality of feature points of the road sign 21 from the dictionary section 80. The matching section 85 performs matching, for each read feature point of the road sign 21, the feature quantity of that feature point and the feature quantity of the feature point candidate supplied from the feature point detection section 84, selecting the feature point candidate with the highest similarity, as a feature point of the road sign 21. The matching section 85 supplies, to the estimation section 86, the 2D position of the selected feature point of the road sign 21 on the image.

It should be noted, however, that if, for example, the highest similarity of a given number of feature points or more of the feature points of the road sign 21 is equal to a threshold or less, the matching section 85 decides that the road sign 21 does not exist in the image supplied from the camera 13 and does not supply anything to the estimation section 86.

The estimation section 86 finds a 3D position of each feature point of the road sign 21 with respect to the camera 13 on the basis of the 2D position of each feature point of the road sign 21 on the image supplied from the matching section 82 and the imaging parameters supplied from the camera 13. The estimation section 86 estimates the 3D position and orientation of the road sign 21 with respect to the camera 13 on the basis of the 3D position of each of the feature points of the road sign 21 with respect to the camera 13 and supplies the 3D position and orientation to the recognition section 87.

The recognition section 87 recognizes relationships between the 3D positions and orientations of the cameras 12 and 13 on the basis of the 3D position and orientation of the road sign 21 with respect to the camera 12 from the estimation section 83 and the 3D position and orientation of the road sign 21 with respect to the camera 13 from the estimation section 86. The recognition section 87 supplies the recognized relationships between the 3D positions and orientations of the cameras 12 and 13 to the correction section 46 depicted in FIG. 2.

Description of Processes Handled by Image Processing Apparatus

Figure 5:
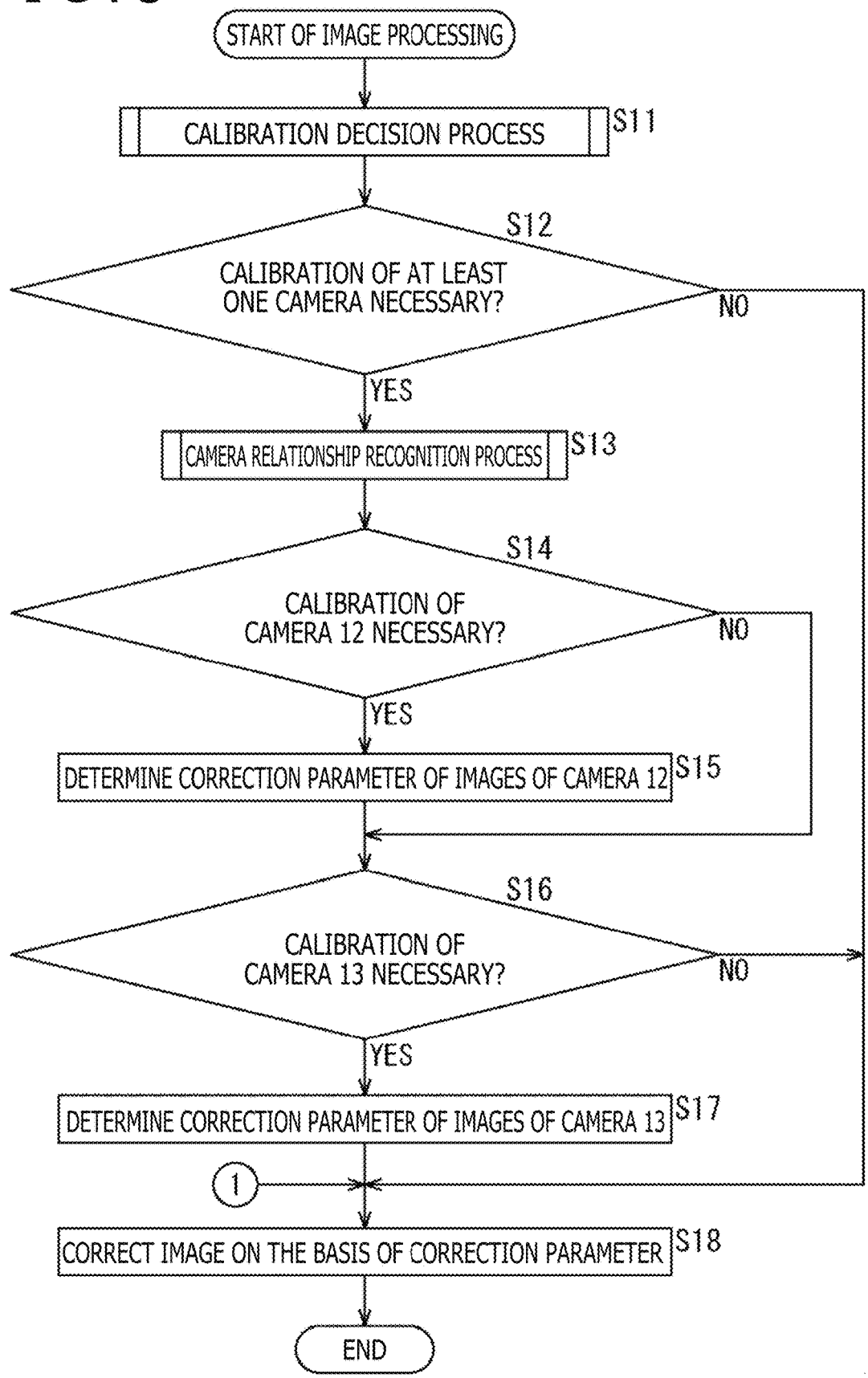
FIG. 5 is a flowchart describing image processing of the image processing apparatus depicted in FIG. 2.

FIG. 5 is a flowchart describing image processing of the image processing apparatus 40 depicted in FIG. 2. This image processing starts, for example, when images captured by the cameras 12 and 13 are input to the image processing apparatus 40.

In step S11 depicted in FIG. 5, the image processing apparatus 40 performs a calibration decision process that decides whether or not it is necessary to calibrate the cameras 12 and 13. Details of this calibration decision process will be described with reference to FIG. 6 which will be described later.

In step S12, the position detection section 45 decides whether it is necessary to calibrate at least one of the cameras 12 and 13 on the basis of decision results supplied from the decision section 42 and the decision section 44.

Specifically, in a case where calibration is necessary according to the decision result supplied from at least one of the decision section 42 and the decision section 44, the position detection section 45 decides that it is necessary to calibrate at least one of the cameras 12 and 13. On the other hand, in a case where calibration is not necessary according to both of the decision results supplied from the decision section 42 and the decision section 44, the position detection section 45 decides that it is not necessary to calibrate both the cameras 12 and 13.

In a case where it is decided in step S12 that at least one of the cameras 12 and 13 needs calibration, the position detection section 45 performs, in step S13, a camera relationship recognition process that recognizes relationships between 3D positions and orientations of the cameras 12 and 13. Details of this camera relationship recognition process will be described with reference to FIG. 7 which will be described later.

In step S14, the correction section 46 decides whether it is necessary to calibrate the camera 12 on the basis of the decision result supplied from the decision section 42.

In a case where it is decided in step S14 that the camera 12 needs calibration, the process proceeds to step S15. In step S15, the correction section 46 determines a correction parameter used to correct images of the camera 12 on the basis of the relationships between the 3D positions and orientations of the cameras 12 and 13 supplied from the position detection section 45 and retains (updates) the correction parameter. Then, the process proceeds to step S16.

On the other hand, in a case where it is decided in step S14 that the camera 12 does not need calibration, the process proceeds to step S16.

In step S16, the correction section 46 decides whether it is necessary to calibrate the camera 13 on the basis of the decision result supplied from the decision section 44.

In a case where it is decided in step S16 that the camera 13 needs calibration, the process proceeds to step S17. In step S17, the correction section 46 determines a correction parameter used to correct images of the camera 13 on the basis of the relationships between the 3D positions and orientations of the camera 13 and the camera 13 supplied from the position detection section 45 and retains (updates) the correction parameter. Then, the process proceeds to step S18.

On the other hand, in a case where it is decided in step S16 that the camera 13 does not need calibration, the process proceeds to step S18.

Also, in a case where it is decided in step S12 that both the cameras 12 and 13 do not need calibration, the process proceeds to step S18.

In step S18, the correction section 46 corrects the images supplied from the cameras 12 and 13 using the retained correction parameters, outputs the corrected images, and terminates the process.

Figure 6:
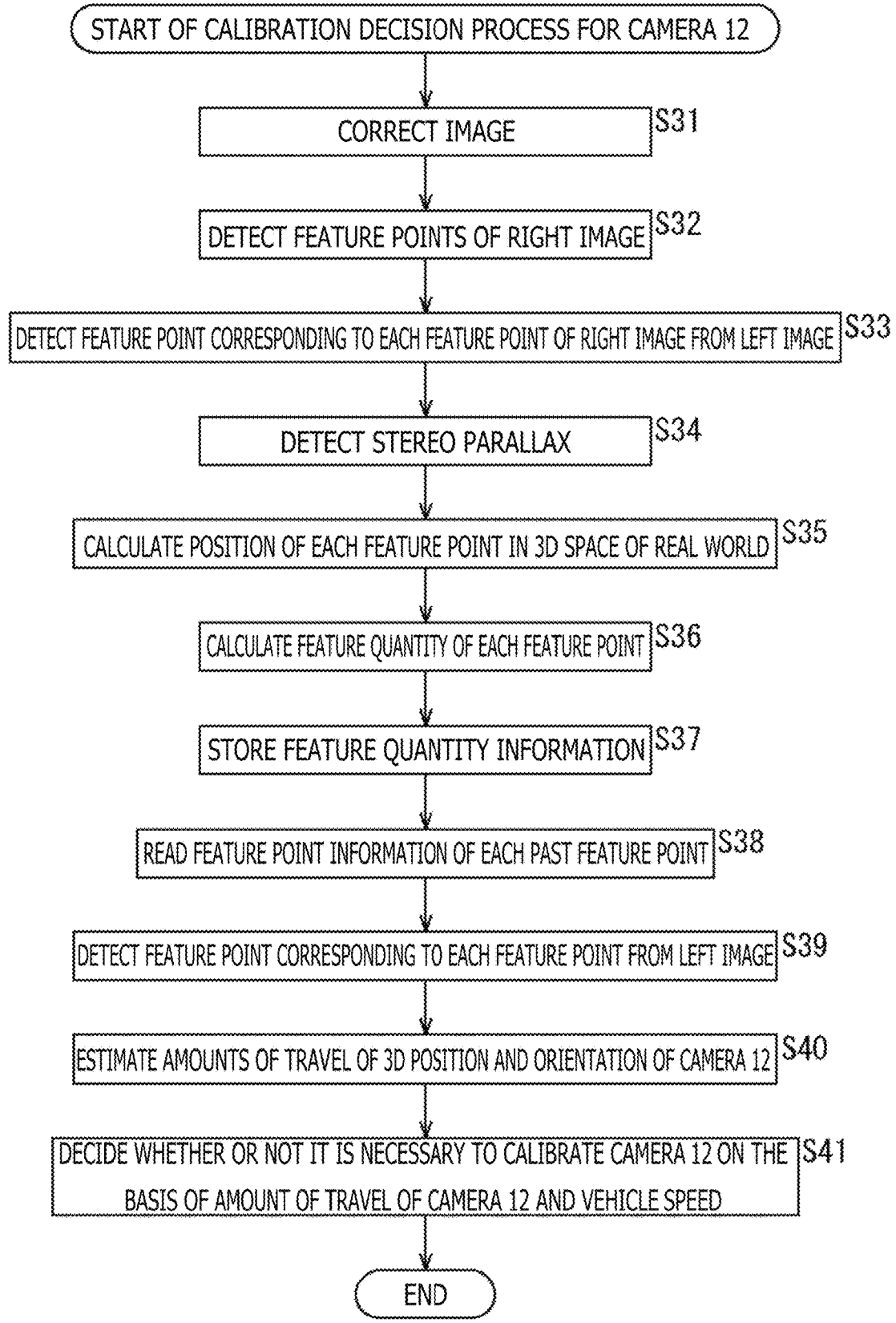
FIG. 6 is a flowchart describing details of a calibration decision process depicted in FIG. 5.

FIG. 6 is a flowchart describing, of the calibration decision process in step S11 in FIG. 5, details of the calibration decision process for the camera 12 to decide whether or not it is necessary to calibrate the camera 12.

In step S31 depicted in FIG. 6, the image correction section 61 corrects the image supplied from the camera 12 on the basis of the correction parameter of the camera 12 retained by the correction section 46 depicted in FIG. 2 such that the image faces the same direction as the image supplied from the camera 13. The image correction section 61 supplies the corrected image to the parallax detection section 64 and the motion matching section 68 as a left image. Also, the image correction section 62 corrects the image supplied from the camera 13 on the basis of the correction parameter of the camera 13 retained by the correction section 46 depicted in FIG. 2 such that the image faces the same direction as the image supplied from the camera 12. The image correction section 62 supplies the corrected image to the feature point detection section 63 as a right image.

In step S32, the feature point detection section 63 detects feature points of the right image supplied from the image correction section 62. The feature point detection section 63 supplies right feature point position information of each of the detected feature points and the right image to the parallax detection section 64 and the feature quantity calculation section 66.

In step S33, the parallax detection section 64 detects a feature point corresponding to each feature point of the right image from the left image supplied from the image correction section 61 on the basis of the right feature point position information and the right image supplied from the feature point detection section 63. The parallax detection section 64 supplies, to the position calculation section 65, left feature point position information of each of the detected feature points and the right feature point position information.

In step S34, the parallax detection section 64 detects a difference between the position indicated by the right feature point position information and the position indicated by the left feature point position information as a stereo parallax and supplies the stereo parallax of each of the feature points to the position calculation section 65.

In step S35, the position calculation section 65 calculates a position of each of the feature points in the 3D space of the real world on the basis of the stereo parallax supplied from the parallax detection section 64, the right feature point position information and the left feature point position information. The position calculation section 65 supplies 3D position information of each feature point to the feature quantity calculation section 66.

In step S36, the feature quantity calculation section 66 calculates a feature quantity of each feature point on the basis of the right feature point position information and the right image supplied from the feature point detection section 63.

In step S37, the feature quantity calculation section 66 supplies feature point information including 3D position information of each feature point to the map information storage section 67 for storage.

In step S38, the motion matching section 68 reads, from the map information storage section 67, feature point information of each feature point detected from past left and right images.

In step S39, the motion matching section 68 detects, on the basis of the feature quantity of each feature point included in the read feature point information, a feature point corresponding to that feature point from the current left image supplied from the image correction section 61. The motion matching section 68 supplies, to the amount-of-travel calculation section 69, the 3D position information of each feature point included in the read feature point information and left feature point position information corresponding to that feature point.

In step S40, the amount-of-travel calculation section 69 estimates frame-to-frame amounts of travel of the 3D position and orientation of the camera 12 on the basis of the 3D position information and the left feature point position information supplied from the motion matching section 68. The amount-of-travel calculation section 69 supplies the estimated amounts of travel to the decision section 42.

In step S41, the decision section 42 decides whether or not it is necessary to calibrate the camera 12 on the basis of the amounts of travel of the camera 12 supplied from the amount-of-travel estimation section 41 and the speed of the vehicle 11 measured by the speedometer, not depicted, which is mounted to the vehicle 11. The decision section 42 supplies the decision result to the position detection section 45 and the correction section 46.

It should be noted that, of the calibration decision process, the calibration decision process for the camera 13 that decides whether or not it is necessary to calibrate the camera 13 is not depicted because this process is similar to the calibration decision process for the camera 12 depicted in FIG. 6 except for the processes from step S39 to step S41.

In the calibration decision process for the camera 13, feature points are detected from the right image in step S39, amounts of travel of the 3D position and orientation of the camera 13 are estimated in step S40, and whether or not the camera 13 needs calibration is decided in step S41.

Figure 7:
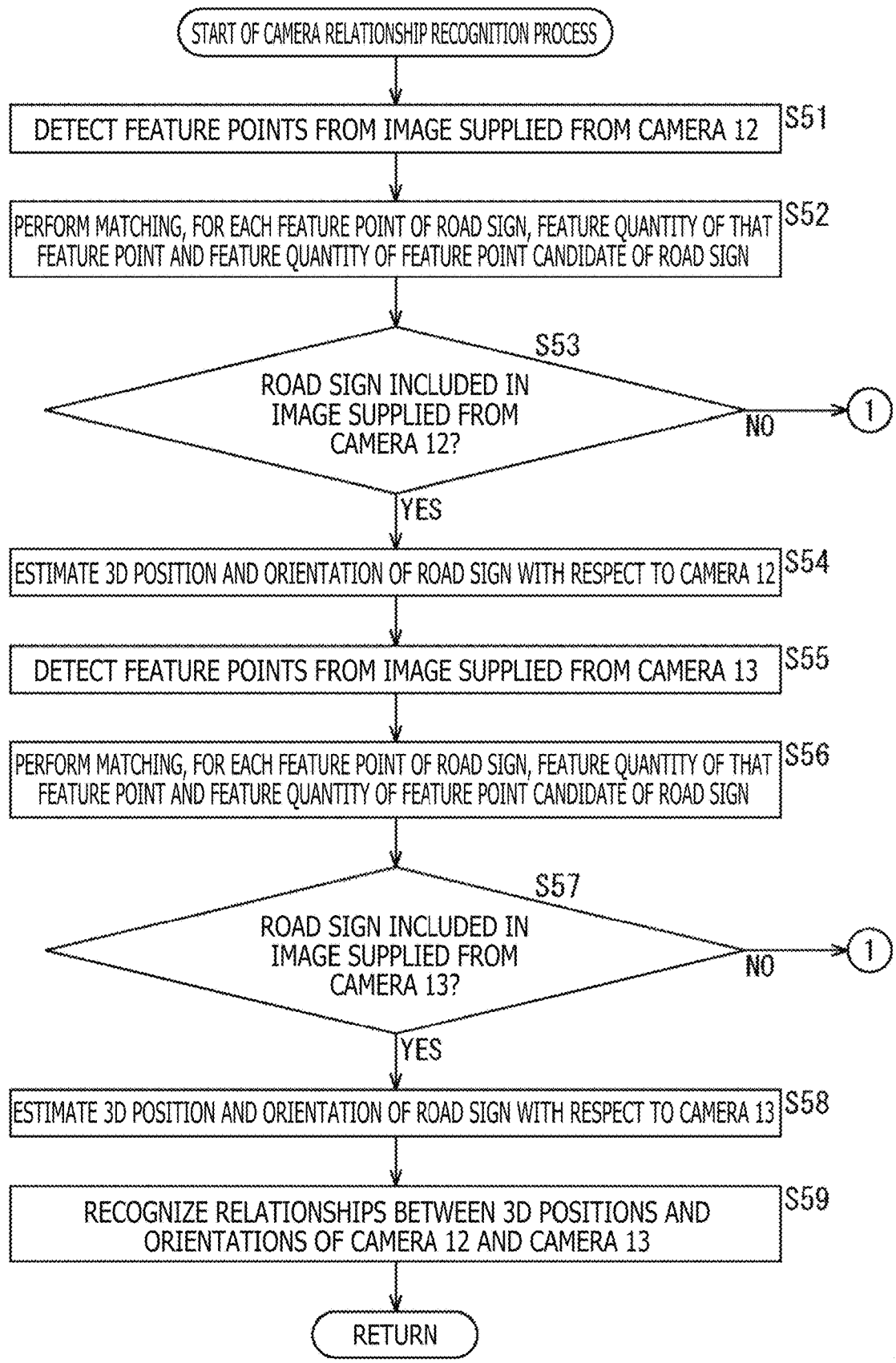
FIG. 7 is a flowchart describing details of a camera relationship recognition process depicted in FIG. 5.

FIG. 7 is a flowchart describing details of the camera relationship recognition process in step S13 in FIG. 5.

In step S51 depicted in FIG. 7, the feature point detection section 81 (FIG. 4) detects feature points from the image supplied from the camera 12 for use as feature point candidates of the road sign 21. The feature point detection section 81 supplies feature quantities of the feature point candidates of the road sign 21 and 2D positions on the image to the matching section 82.

In step S52, the matching section 82 performs matching, for each feature point of the road sign 21 whose feature quantity is retained by the dictionary section 80, between the feature quantity of that feature point and the feature quantity of the feature point candidate of the road sign 21 supplied from the feature point detection section 81. The matching section 82 selects the feature point candidate of the road sign 21 with the highest similarity obtained as a result of the matching as a feature point of the road sign 21.

In step S53, the matching section 82 decides whether the road sign is included in the image supplied from the camera 12. For example, in a case where, of the selected feature points of the road sign 21, the number of feature points whose similarities are equal to a threshold or less is smaller than a given number, the matching section 82 decides that the road sign is included in the image supplied from the camera 12, and if the number of feature points is equal to the given number or larger, the matching section 82 decides that the road sign is not included.

In a case where it is decided in step S53 that the road sign is included in the image supplied from the camera 12, the matching section 82 supplies 2D positions of the selected feature points of the road sign 21 on the image to the estimation section 83.

Then, in step S54, the estimation section 83 estimates the 3D position and orientation of the road sign 21 with respect to the camera 12 on the basis of the 2D positions of the feature points of the road sign 21 on the image supplied from the matching section 82 and the imaging parameters supplied from the camera 12. The estimation section 83 supplies, to the recognition section 87, the estimated 3D position and orientation of the road sign 21 with respect to the camera 12.

In step S55, the feature point detection section 84 detects feature points from the image supplied from the camera 13 for use as feature point candidates of the road sign 21. The feature point detection section 84 supplies feature quantities of the feature point candidates of the road sign 21 and 2D positions on the image to the matching section 85.

In step S56, the matching section 85 performs matching, for each feature point of the road sign 21 whose feature quantity is retained by the dictionary section 80, between the feature quantity of that feature point and the feature quantity of the feature point candidate of the road sign 21 supplied from the feature point detection section 84. The matching section 85 selects the feature point candidate of the road sign 21 with the highest similarity obtained as a result of matching as a feature point of the road sign 21.

In step S57, the matching section 85 decides whether the road sign is included in the image supplied from the camera 13 as does the matching section 82. In a case where it is decided, in step S57, that the road sign is included in the image supplied from the camera 13, the matching section 85 supplies 2D positions of the selected feature points of the road sign 21 on the image to the estimation section 86.

Then, in step S58, the estimation section 86 estimates the 3D position and orientation of the road sign 21 with respect to the camera 13 on the basis of the 2D positions of the feature points of the road sign 21 on the image supplied from the matching section 85 and the imaging parameters supplied from the camera 13. The estimation section 83 supplies, to the recognition section 87, the estimated 3D position and orientation of the road sign 21 with respect to the camera 13.

In step S59, the recognition section 87 recognizes the relationships between the 3D positions and orientations of the cameras 12 and 13 on the basis of the 3D position and orientation of the road sign 21 with respect to the camera 12 and the 3D position and orientation of the road sign 21 with respect to the camera 13. The recognition section 87 supplies the relationships between the 3D positions and orientations of the cameras 12 and 13 to the correction section 46 depicted in FIG. 2. Then, the process returns to step S13 depicted in FIG. 5 and proceeds to step S14.

On the other hand, in a case where it is decided, in step S53, that the road sign is not included in the image supplied from the camera 12, or in a case where it is decided, in step S57, that the road sign is not included in the image supplied from the camera 13, the process proceeds to step S18 depicted in FIG. 5.

Thus, the image processing apparatus 40 estimates the 3D positions of the road sign 21, a known object often captured by the cameras 12 and 13 under normal use of the vehicle-mounted camera system 10 and existing in moderate numbers on roads, with respect to the cameras 12 and 13. Then, the image processing apparatus 40 recognizes the positional relationship between the cameras 12 and 13 on the basis of that 3D position and calibrates the cameras 12 and 13 on the basis of that relationship.

Therefore, it is possible to increase the calibration frequency of the cameras 12 and 13 as compared to calibration such as shooting a specific pattern that requires a special environment and equipment. Also, it is not readily affected by the shooting environment, making it possible to calibrate the cameras 12 and 13 with high accuracy. Further, calibration of the cameras 12 and 13 requires only a limited amount of processing.

Also, the image processing apparatus 40 estimates an amount of travel of the camera 12 (camera 13) using images captured by the camera 12 (camera 13) at different times and decides whether or not it is necessary to calibrate the camera 12 (camera 13) on the basis of the amount of travel.

Therefore, it is possible to calibrate the camera 12 (camera 13) only if the 3D position or orientation of the camera 12 (camera 13) deviates. As a result, it is possible to reduce power consumption of the image processing apparatus 40 and the capability and number of the processors that realize the image processing apparatus 40.

Second Embodiment

Overview of Second Embodiment of Vehicle-Mounted Camera System

Figure 8:
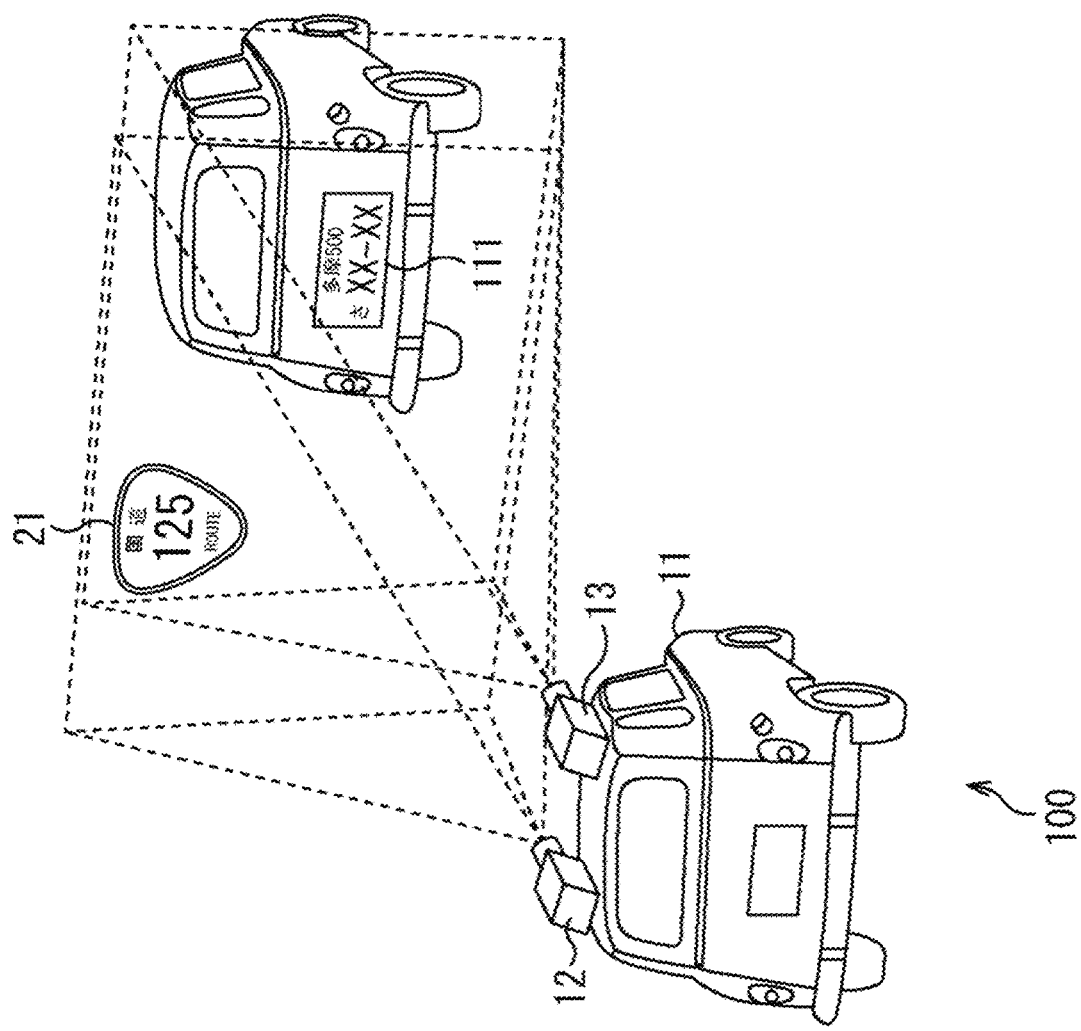
FIG. 8 is a diagram illustrating an overview of a second embodiment of the vehicle-mounted camera system to which the present disclosure is applied.

FIG. 8 is a diagram illustrating an overview of a second embodiment of the vehicle-mounted camera system to which the present disclosure is applied.

Of the components depicted in FIG. 8, the components identical to those depicted in FIG. 1 are denoted by the same reference numerals. Redundant description will be omitted as appropriate.

The configuration of a vehicle-mounted camera system 100 depicted in FIG. 8 differs from that of the vehicle-mounted camera system 10 depicted in FIG. 1 in that there are two known objects, i.e., the road sign 21 and a number plate 111.

The image processing apparatus, not depicted, mounted to the vehicle 11 estimates 3D positions and orientations of the road sign 21 and the number plate 111 with respect to each of the cameras 12 and 13. Then, the image processing apparatus recognizes relationships between 3D positions and orientations of the cameras 12 and 13 on the basis of the 3D positions and orientations of the road sign 21 and the number plate 111 with respect to each of the cameras 12 and 13, and estimation accuracy of the 3D positions and orientations. The image processing apparatus calibrates the cameras 12 and 13 on the basis of the relationships.

The configuration of the image processing apparatus of the second embodiment is similar to that of the image processing apparatus 40 depicted in FIG. 2 except for the configuration of the position detection section 45. Therefore, only the position detection section 45 will be described below.

Configuration Example of Position Detection Section

Figure 9:
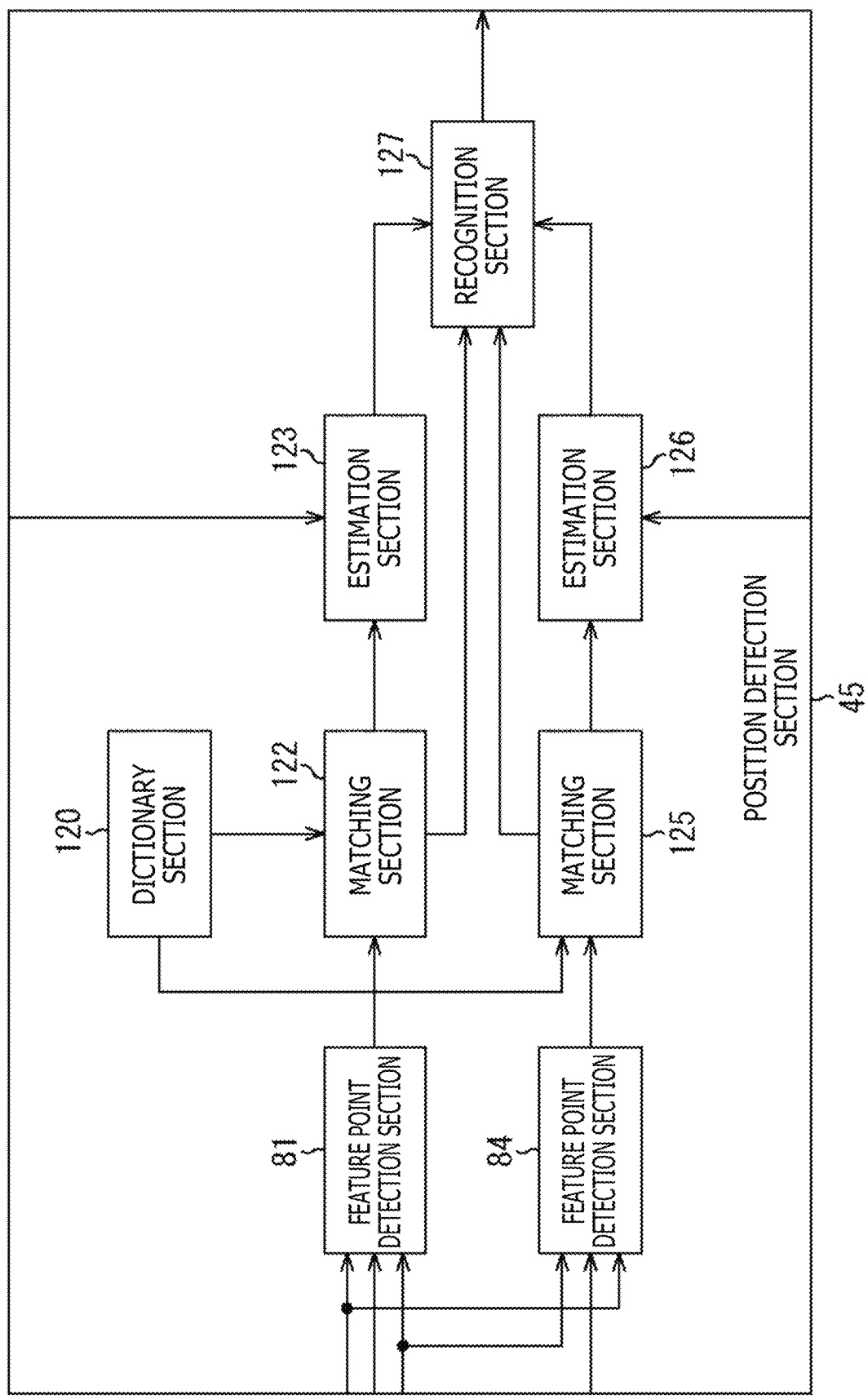
FIG. 9 is a block diagram illustrating a configuration example of the position detection section of the vehicle-mounted camera system depicted in FIG. 8.

FIG. 9 is a block diagram illustrating a configuration example of the position detection section 45 of the vehicle-mounted camera system 100.

Of the components depicted in FIG. 9, the components identical to those depicted in FIG. 4 are denoted by the same reference numerals. Redundant description will be omitted as appropriate.

The configuration of the position detection section 45 depicted in FIG. 9 differs from that of the configuration depicted in FIG. 4 in that a dictionary section 120, a matching section 122, an estimation section 123, a matching section 125, an estimation section 126, and a recognition section 127 are provided in place of the dictionary section 80, the matching section 82, the estimation section 83, the matching section 85, the estimation section 86, and the recognition section 87.

The dictionary section 120 retains feature quantities of a plurality of feature points of the road sign 21 and the number plate 111, known objects.

The matching section 122 reads the feature quantities of the plurality of feature points of the road sign 21 and the number plate 111 from the dictionary section 120. The matching section 122 selects, for each read feature point of the road sign 21, a feature point of the road sign 21 from among the feature point candidates supplied from the feature point detection section 81 as does the matching section 82 depicted in FIG. 4.

Also, the matching section 122 performs matching, for each read feature point of the number plate 111, between the feature quantity of that feature point and the feature quantity of the feature point candidate supplied from the feature point detection section 81. The matching section 122 selects the feature point candidate with the highest similarity obtained as a result of the matching as a feature point of the number plate 111.

The matching section 122 supplies the 2D positions of the selected feature points of the road sign 21 and the number plate 111 on the image to the estimation section 123. Also, the matching section 122 supplies, to the recognition section 127, similarity associated with the selected feature points of the road sign 21 and the number plate 111 as estimation accuracy by the estimation section 123.

It should be noted, however, that if, for example, the highest similarity of a given number of feature points or more of the feature points of the road sign 21 is equal to a threshold or less, the matching section 122 decides that the road sign 21 does not exist in the image supplied from the camera 12 and does not supply anything to the estimation section 123. It is also true for the number plate 111.

The estimation section 123 estimates the 3D position and orientation of the road sign 21 with respect to the camera 12 on the basis of the 2D positions of the feature points of the road sign 21 on the image supplied from the matching section 122 and the imaging parameters supplied from the camera 12 as does the estimation section 83 depicted in FIG. 4. The estimation section 123 supplies, to the recognition section 127, the 3D position and orientation of the road sign 21 with respect to the camera 12.

Also, the estimation section 123 finds a 3D position of each feature point of the number plate 111 with respect to the camera 12 on the basis of the 2D position of the feature point of the number plate 111 on the image supplied from the matching section 122 and the imaging parameters of the camera 12. Then, the estimation section 123 estimates the 3D position and orientation of the number plate 111 with respect to the camera 13 on the basis of the 3D position of each of the feature points of the number plate 111 with respect to the camera 12 and supplies the 3D position and orientation to the recognition section 127.

The matching section 125 reads the feature quantities of the plurality of feature points of the road sign 21 and the number plate 111 from the dictionary section 120. The matching section 125 selects, for each read feature point of the road sign 21, a feature point of the road sign 21 from among the feature point candidates supplied from the feature point detection section 84 as does the matching section 85 depicted in FIG. 4.

Also, the matching section 125 performs matching, for each read feature point of the number plate 111, between the feature quantity of that feature point and the feature quantity of the feature point candidate supplied from the feature point detection section 84. The matching section 125 selects the feature point candidate with the highest similarity obtained as a result of the matching as a feature point of the number plate 111.

The matching section 125 supplies the 2D positions of the selected feature points of the road sign 21 and the number plate 111 on the image to the estimation section 126. Also, the matching section 125 supplies, to the recognition section 127, similarity associated with the selected feature points of the road sign 21 and the number plate 111 as an estimation accuracy by the estimation section 126.

It should be noted, however, that if, for example, the highest similarity of a given number of feature points or more of the feature points of the road sign 21 is equal to a threshold or less, the matching section 125 decides that the road sign 21 does not exist in the image supplied from the camera 13 and does not supply anything to the estimation section 126. It is also true for the number plate 111.

The estimation section 126 estimates the 3D position and orientation of the road sign 21 with respect to the camera 13 on the basis of the 2D positions of the feature points of the road sign 21 on the image supplied from the matching section 125 and the imaging parameters supplied from the camera 13 as does the estimation section 86 depicted in FIG. 4. The estimation section 126 supplies, to the recognition section 127, the 3D position and orientation of the road sign 21 with respect to the camera 13.

Also, the estimation section 126 estimates the 3D position and orientation of the number plate 111 with respect to the camera 13 on the basis of the 2D positions of the feature points of the number plate 111 on the image supplied from the matching section 125 and the imaging parameters of the camera 13 and supplies the 3D position and orientation to the recognition section 127.

The recognition section 127 recognizes relationships between 3D positions and orientations of the cameras 12 and 13 on the basis of the 3D positions and orientations of the road sign 21 and the number plate 111 with respect to each of the cameras 12 and 13, and estimation accuracies by the estimation sections 123 and 126.

Specifically, for example, the recognition section 127 selects the road sign 21 or the number plate 111 associated with whichever is higher, the average estimation accuracy with respect to the road sign 21 or the average estimation accuracy with respect to the number plate 111 by the estimation sections 123 and 126. The recognition section 127 recognizes relationships between 3D positions and orientations of the cameras 12 and 13 on the basis of the 3D positions and orientations of the road sign 21 or the number plate 111 with respect to each of the cameras 12 and 13.

Alternatively, the recognition section 127 specifies a weight of the road sign 21 on the basis of the average estimation accuracy with respect to the road sign 21 by the estimation section 123 and the estimation section 126 such that the higher the average estimation accuracy, the larger the weight. Also, the recognition section 127 specifies a weight of the number plate 111 on the basis of the average estimation accuracy with respect to the number plate 111 by the estimation section 123 and the estimation section 126 such that the higher the average estimation accuracy, the larger the weight.

Then, the recognition section 127 recognizes, for each of the road sign 21 and the number plate 111, relationships between 3D positions and orientations of the cameras 12 and 13 on the basis of the 3D positions and orientations with respect to each of the cameras 12 and 13. The recognition section 127 performs weighted addition of the 3D positions and orientations of the cameras 12 and 13 recognized from the 3D positions and orientations of the road sign 21 and the number plate 111 using the specified weights. The recognition section 127 recognizes the weighted addition results as the final relationships between 3D positions and orientations of the cameras 12 and 13.

The recognition section 127 supplies, to the correction section 46 depicted in FIG. 2, the recognized relationships between 3D positions and orientations of the cameras 12 and 13.

It should be noted that although, here, the estimation accuracies by the estimation sections 123 and 126 are, respectively, similarities in the matching sections 122 and 125, the estimation accuracies by the estimation sections 123 and 126 may be determined on the basis of 3D positions and orientations estimated by the estimation sections 123 and 126.

Also, the camera relationship recognition process handled by the position detection section 45 depicted in FIG. 9 is similar to the camera relationship recognition process depicted in FIG. 7 except that the road sign 21 is replaced by the road sign 21 and the number plate 111 and that estimation accuracies by the estimation sections 123 and 126 are used in the process in step S59. Therefore, the description is omitted.

It should be noted that in a case where only one of the road sign 21 and the number plate 111 is included in the images supplied from both the cameras 12 and 13, the recognition section 127 may recognize relationships between 3D positions and orientations of the cameras 12 and 13 on the basis of the 3D positions and orientations of that one of the road sign 21 and the number plate 111 with respect to each of the cameras 12 and 13, as does the recognition section 87 depicted in FIG. 4.

Third Embodiment

Overview of Third Embodiment of Vehicle-Mounted Camera System

Figure 10:
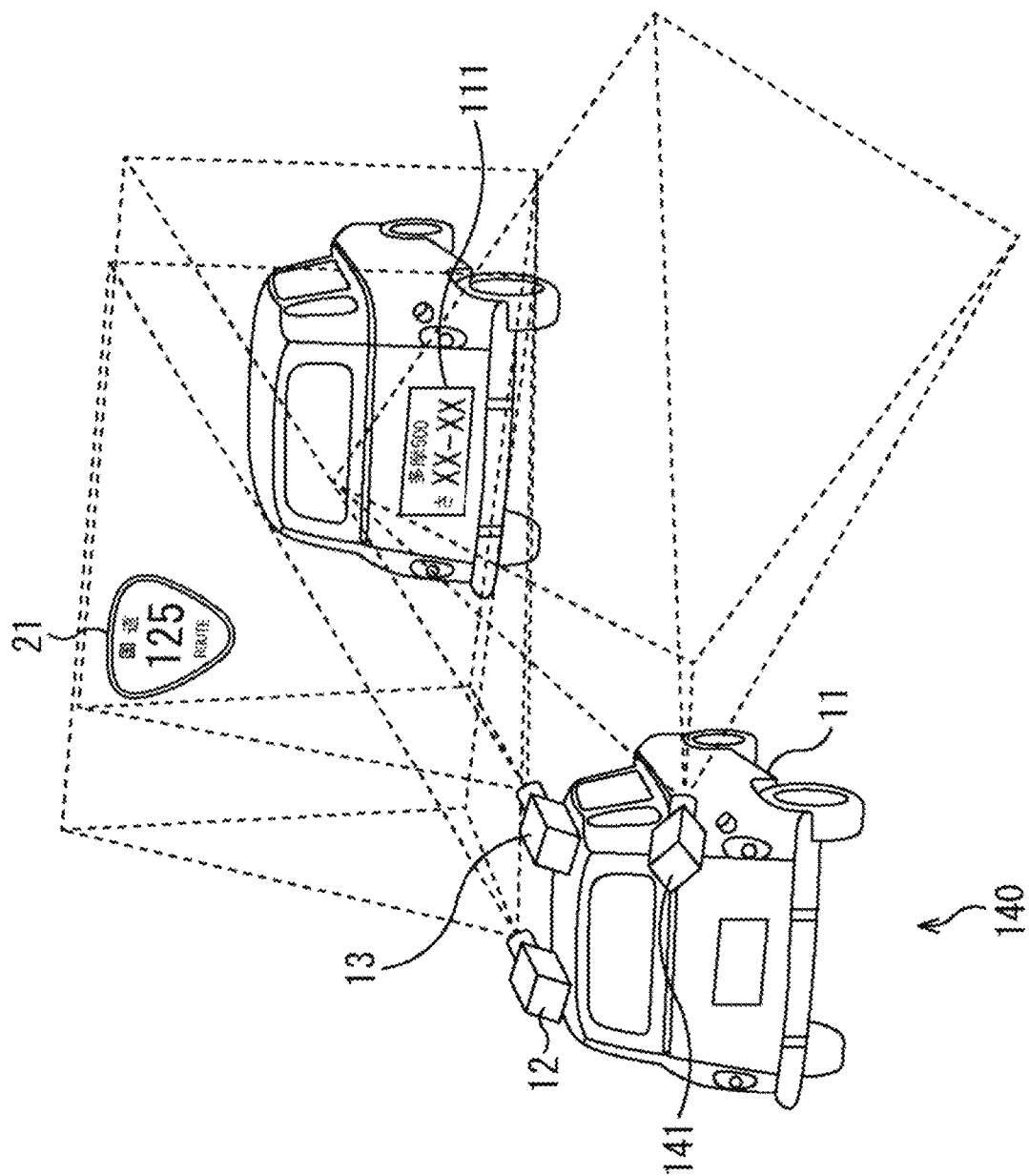
FIG. 10 is a diagram illustrating an overview of a third embodiment of the vehicle-mounted camera system to which the present disclosure is applied.

FIG. 10 is a diagram illustrating an overview of a third embodiment of the vehicle-mounted camera system to which the present disclosure is applied.

Of the components depicted in FIG. 10, the components identical to those depicted in FIG. 8 are denoted by the same reference numerals. Redundant description will be omitted as appropriate.

The configuration of a vehicle-mounted camera system 140 depicted in FIG. 10 differs from that of the vehicle-mounted camera system 100 depicted in FIG. 8 in that not only the cameras 12 and 13 but also a camera 141 are mounted to the vehicle 11.

The camera 141 is mounted to a rear portion of the vehicle 11 to image forward the vehicle 11. Each of the cameras 12, 13, and 141 has an imaging region that overlaps with the imaging region of at least one other camera.

In the example depicted in FIG. 10, the road sign 21, a known object ahead of the vehicle 11, is included in the imaging regions of the cameras 12 and 13. Also, the number plate 111, a known object ahead of the vehicle 11, is included in the imaging regions of the cameras 12, 13 and 141.

In this case, the image processing apparatus, not depicted, which is mounted to the vehicle 11 estimates 3D positions and orientations of the road sign 21 with respect to each of the cameras 12 and 13. Also, the image processing apparatus estimates 3D positions and orientations of the number plate 111 with respect to each of the cameras 12, 13, and 141.

The image processing apparatus recognizes relationships between 3D positions and orientations of the cameras 12, 13, and 141 on the basis of the 3D positions and orientations of the road sign 21 with respect to each of the cameras 12 and 13, the 3D positions and orientations of the number plate 111 with respect to each of the cameras 12, 13, and 141, and estimation accuracies of the 3D positions and orientations.

Specifically, for example, the image processing apparatus recognizes relationships between 3D positions and orientations of the cameras 12 and 13 on the basis of the 3D positions and orientations of the road sign 21 and the number plate 111 with respect to each of the cameras 12 and 13, and estimation accuracies of the 3D positions and orientations as does the image processing apparatus of the second embodiment.

Also, the image processing apparatus recognizes relationships between 3D positions and orientations of the camera 12 or 13 and the camera 141 on the basis of the 3D position and orientation of the number plate 111 with respect to either of the cameras 12 and 13, whichever has a higher estimation accuracy, and the 3D position and orientation of the number plate 111 with respect to the camera 141.

Then, the image processing apparatus calibrates the cameras 12, 13, and 141 on the basis of the relationships between 3D positions and orientations of the cameras 12 and 13 and the relationships between 3D positions and orientations of the camera 12 or 13 and the camera 141.

The image processing apparatus of the third embodiment is similar to the image processing apparatus of the second embodiment except that not only processes for the cameras 12 and 13 but also processes for the camera 141 are performed in the similar manner.

It should be noted that three amounts of travel are found by the image processing apparatus of the third embodiment. Therefore, whether or not it is necessary to calibrate the cameras 12, 13, and 141 may be decided on the basis of a distribution of three amounts of travel without using the speed of the vehicle 11 measured by the speedometer. In this case, it is decided that the camera 12, 13, or 141 whose amount of travel is an outlier of the distribution of three amounts of travel needs calibration.

Fourth Embodiment

Overview of Fourth Embodiment of Vehicle-Mounted Camera System

Figure 11:
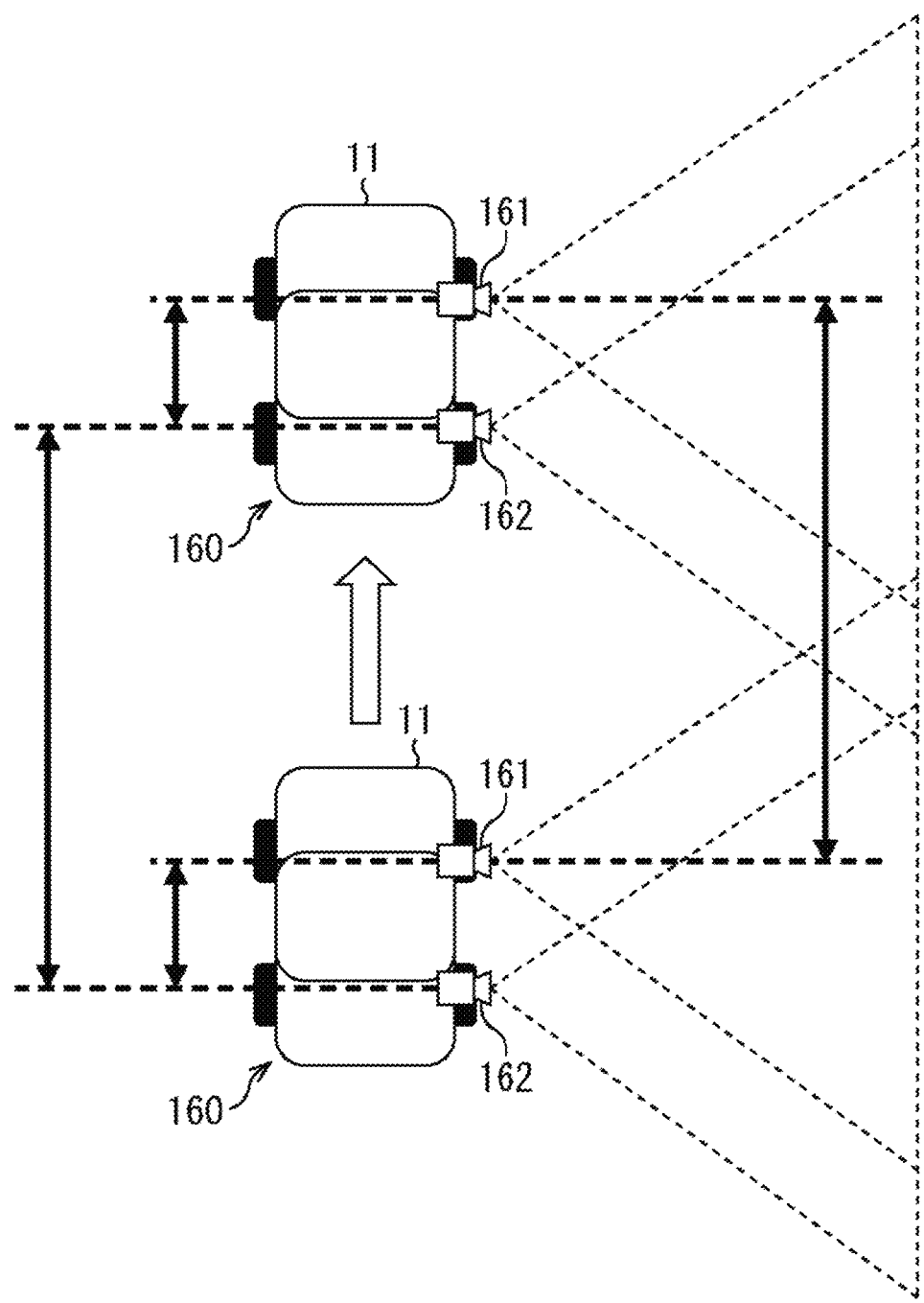
FIG. 11 is a diagram illustrating an overview of a fourth embodiment of the vehicle-mounted camera system to which the present disclosure is applied.

FIG. 11 is a diagram illustrating an overview of a fourth embodiment of the vehicle-mounted camera system to which the present disclosure is applied.

Of the components depicted in FIG. 11, the components identical to those depicted in FIG. 1 are denoted by the same reference numerals. Redundant description will be omitted as appropriate.

The configuration of a vehicle-mounted camera system 160 depicted in FIG. 11 differs from that of the vehicle-mounted camera system 10 depicted in FIG. 1 in that cameras 161 and 162 are provided in place of the cameras 12 and 13. It should be noted that FIG. 11 is a view of the vehicle 11 as seen from above.

The camera 161 (first imaging section) and the camera 162 (second imaging section) are mounted such that the directions of their optical axes are approximately vertical to the direction of travel of the vehicle 11. In the example depicted in FIG. 11, the cameras 161 and 162 are mounted to the right side roof of the vehicle 11.

In the vehicle-mounted camera system 160, the image processing apparatus, not depicted, which is mounted to the vehicle 11 decides whether it is necessary to calibrate the cameras 161 and 162 on the basis of the parallax of images captured by the cameras 161 and 162 rather than amounts of travel.

Configuration Example of Image Processing Apparatus

Figure 12:
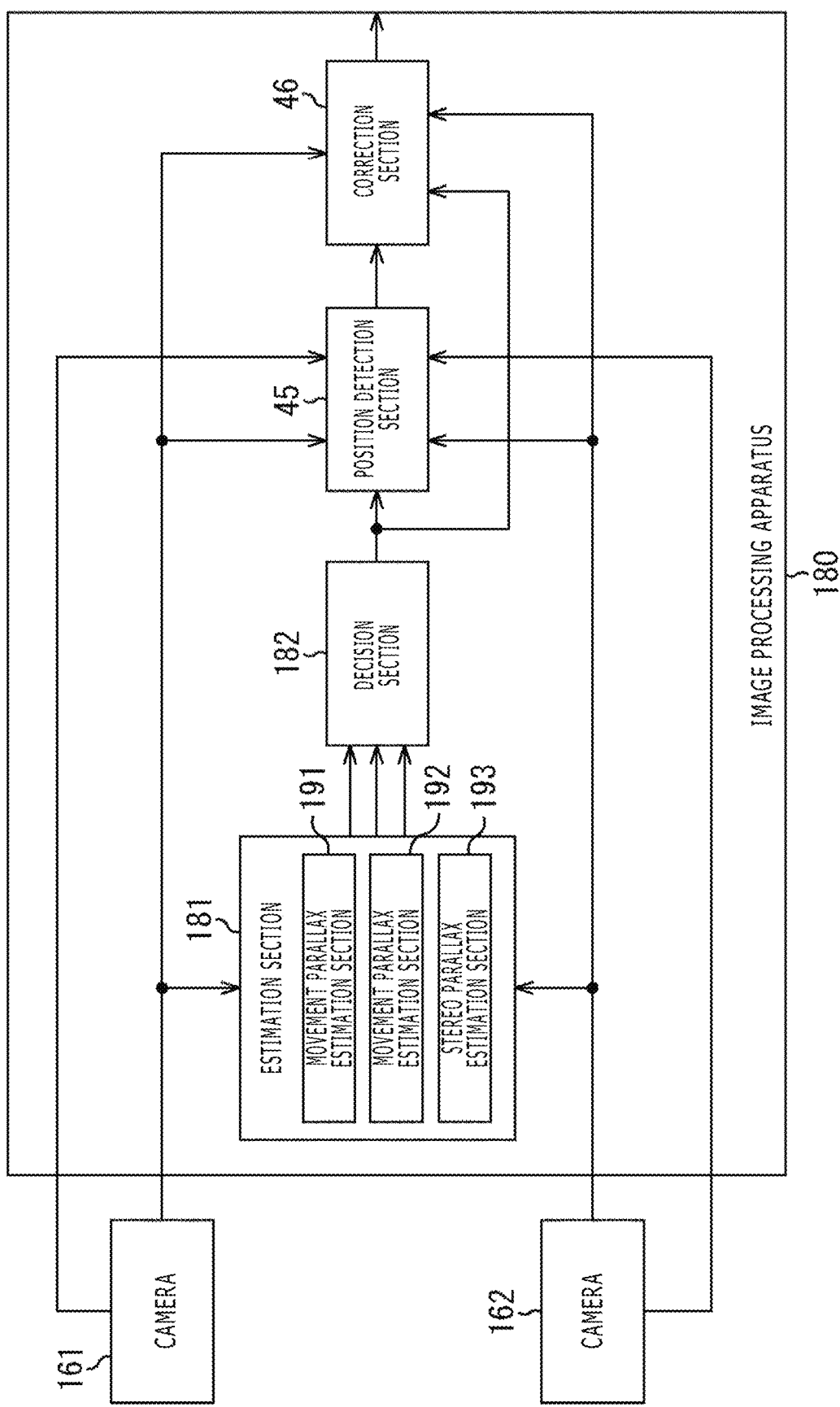
FIG. 12 is a block diagram illustrating a configuration example of the image processing apparatus mounted to a vehicle depicted in FIG. 11.

FIG. 12 is a block diagram illustrating a configuration example of the image processing apparatus mounted to the vehicle 11 depicted in FIG. 11.

Of the components depicted in FIG. 12, the components identical to those depicted in FIG. 2 are denoted by the same reference numerals. Redundant description will be omitted as appropriate.

The configuration of an image processing apparatus 180 depicted in FIG. 12 differs from that of the image processing apparatus 40 depicted in FIG. 2 in that an estimation section 181 is provided in place of the amount-of-travel estimation sections 41 and 43 and a decision section 182 is provided in place of the decision sections 42 and 44.

The estimation section 181 includes a movement parallax estimation section 191, a movement parallax estimation section 192, and a stereo parallax estimation section 193.

The movement parallax estimation section 191 of the estimation section 181 retains an image captured by the camera 161 and input from the camera 161. The movement parallax estimation section 191 (first movement parallax estimation section) estimates a movement parallax (motion parallax) of the current image using the retained past (first time) image and the current (second time) image. The movement parallax estimation section 191 supplies the estimated movement parallax to the decision section 182.

The movement parallax estimation section 192 retains an image captured by the camera 162 and input from the camera 162. The movement parallax estimation section 192 (second movement parallax estimation section) estimates a movement parallax (motion parallax) of the current image using the retained past (first time) image and the current (second time) image. The movement parallax estimation section 192 supplies the estimated movement parallax to the decision section 182.

The stereo parallax estimation section 193 estimates, using the current image captured by the camera 161 and the current image captured by the camera 162, a parallax between the two images (hereinafter referred to as a stereo parallax) and supplies the stereo parallax to the decision section 182.

The decision section 182 decides whether or not it is necessary to calibrate the cameras 161 and 162 on the basis of the movement parallaxes supplied from the movement parallax estimation sections 191 and 192 and the stereo parallax supplied from the stereo parallax estimation section 193. The decision section 182 supplies the decision result to the position detection section 45.

Description of Processes Handled by Image Processing Apparatus

Image processing handled by the image processing apparatus 180 depicted in FIG. 12 is similar to that depicted in FIG. 5 except that the cameras 12 and 13 are replaced by the cameras 161 and 162 and except for the calibration decision process. Therefore, only the calibration decision process will be described below.

Figure 13:
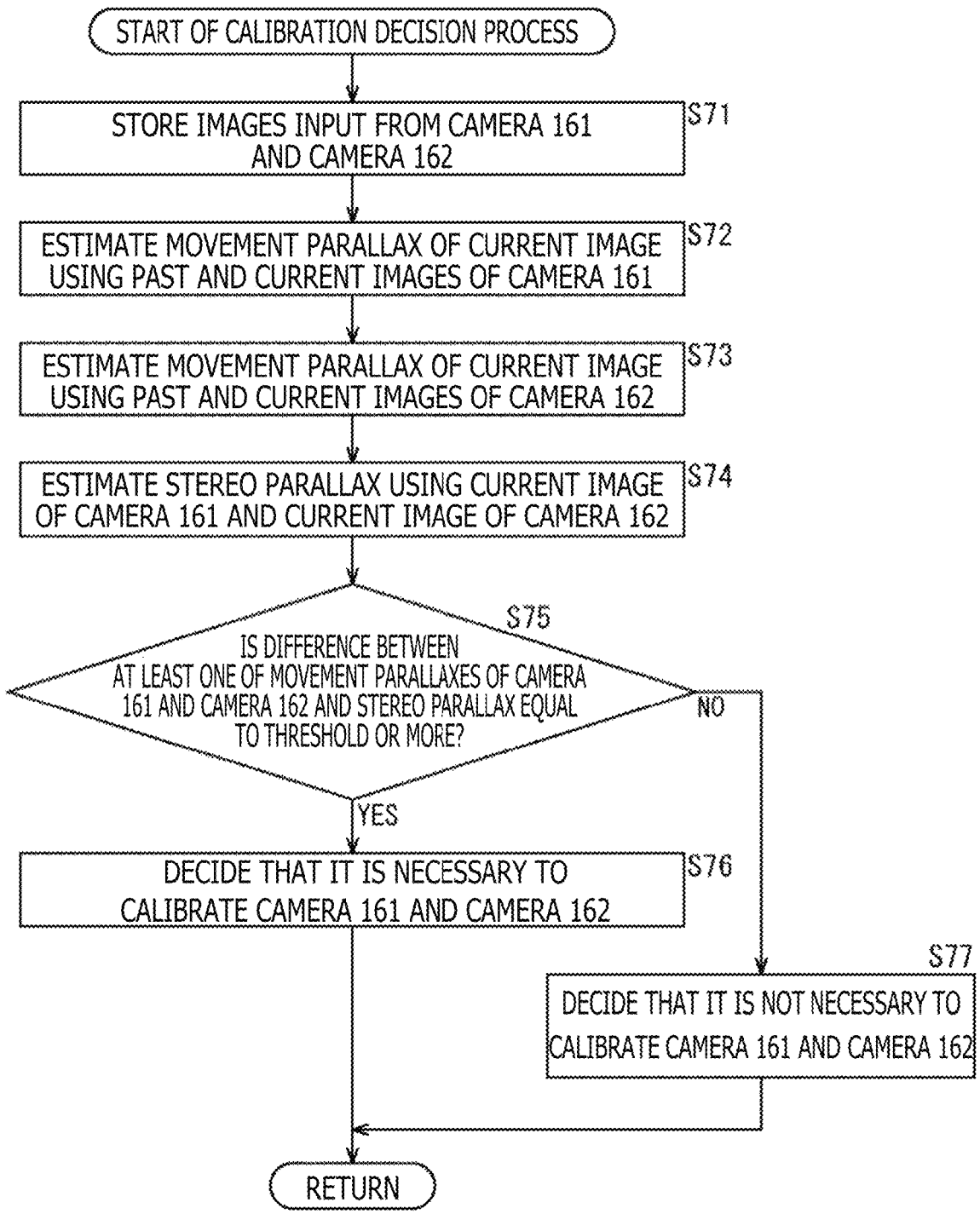
FIG. 13 is a flowchart describing the calibration decision process of the image processing apparatus depicted in FIG. 12.

FIG. 13 is a flowchart describing the calibration decision process of the image processing apparatus 180.

In step S71 depicted in FIG. 13, the movement parallax estimation section 191 of the estimation section 181 retains the image input from the camera 161, and the movement parallax estimation section 192 retains the image input from the camera 162.

In step S72, the movement parallax estimation section 191 estimates, using the retained past image of the camera 161 and the current image, a movement parallax of the current image and supplies the movement parallax to the decision section 182.

In step S73, the movement parallax estimation section 192 estimates, using the retained past image of the camera 162 and the current image, a movement parallax of the current image and supplies the movement parallax to the decision section 182.

In step S74, the stereo parallax estimation section 193 estimates a stereo parallax using the current image of the camera 161 and the current image of the camera 162 and supplies the stereo parallax to the decision section 182.

In step S75, the decision section 182 decides whether the difference between at least one of the movement parallaxes supplied from the movement parallax estimation sections 191 and 192 and the stereo parallax supplied from the stereo parallax estimation section 193 is equal to a threshold or more.

If it is decided in step S75 that the difference is equal to the threshold or more, the decision section 182 decides in step S76 that the cameras 161 and 162 need calibration and supplies the decision result to the position detection section 45. Then, the calibration decision process ends.

On the other hand, in a case where the difference between both of the movement parallaxes supplied from the movement parallax estimation sections 191 and 192 and the stereo parallax is smaller than the threshold in step S75, the process proceeds to step S77. In step S77, the decision section 182 decides in step S77 that the cameras 161 and 162 do not need calibration and supplies the decision result to the position detection section 45.

Fifth Embodiment

Overview of Fifth Embodiment of Vehicle-Mounted Camera System

Figure 14:
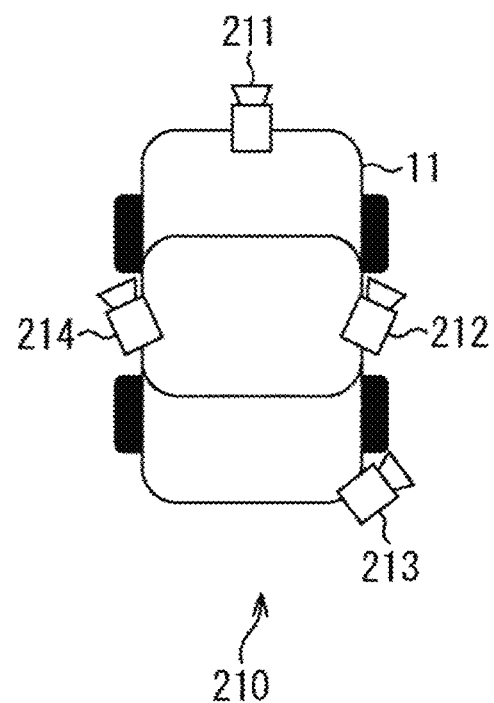
FIG. 14 is a diagram illustrating an overview of a fifth embodiment of the vehicle-mounted camera system to which the present disclosure is applied.

FIG. 14 is a diagram illustrating an overview of a fifth embodiment of the vehicle-mounted camera system to which the present disclosure is applied.

Of the components depicted in FIG. 14, the components identical to those depicted in FIG. 1 are denoted by the same reference numerals. Redundant description will be omitted as appropriate. It should be noted that FIG. 14 is a view of the vehicle 11 as seen from above.

The configuration of a vehicle-mounted camera system 210 depicted in FIG. 14 differs from that of the vehicle-mounted camera system 10 depicted in FIG. 1 in that four cameras 211 to 214 are mounted to the vehicle 11 in place of the cameras 12 and 13.

The cameras 211 to 214 are mounted to the front, right side, back, and left side of the roof of the vehicle 11, respectively. The image processing apparatus, not depicted, which is mounted to the vehicle 11 performs the similar process as in the first to third embodiments for the respective cameras 211 to 214 and calibrates the cameras 211 to 214.

It should be noted that four amounts of travel are found at this time. Therefore, whether or not it is necessary to calibrate the cameras 211 to 214 may be decided on the basis of a distribution of four amounts of travel without using the speed of the vehicle 11 measured by the speedometer as in the third embodiment.

Sixth Embodiment

Description of Computer to which Present Disclosure is Applied

The series of processes of the image processing apparatus described above can be performed not only by hardware but also by software. In a case where the series of processes are performed by software, the program making up the software is installed to a computer. Here, the computer includes computers built into dedicated hardware and general-purpose personal computers such as those capable of performing various functions as various programs are installed thereto.

Figure 15:
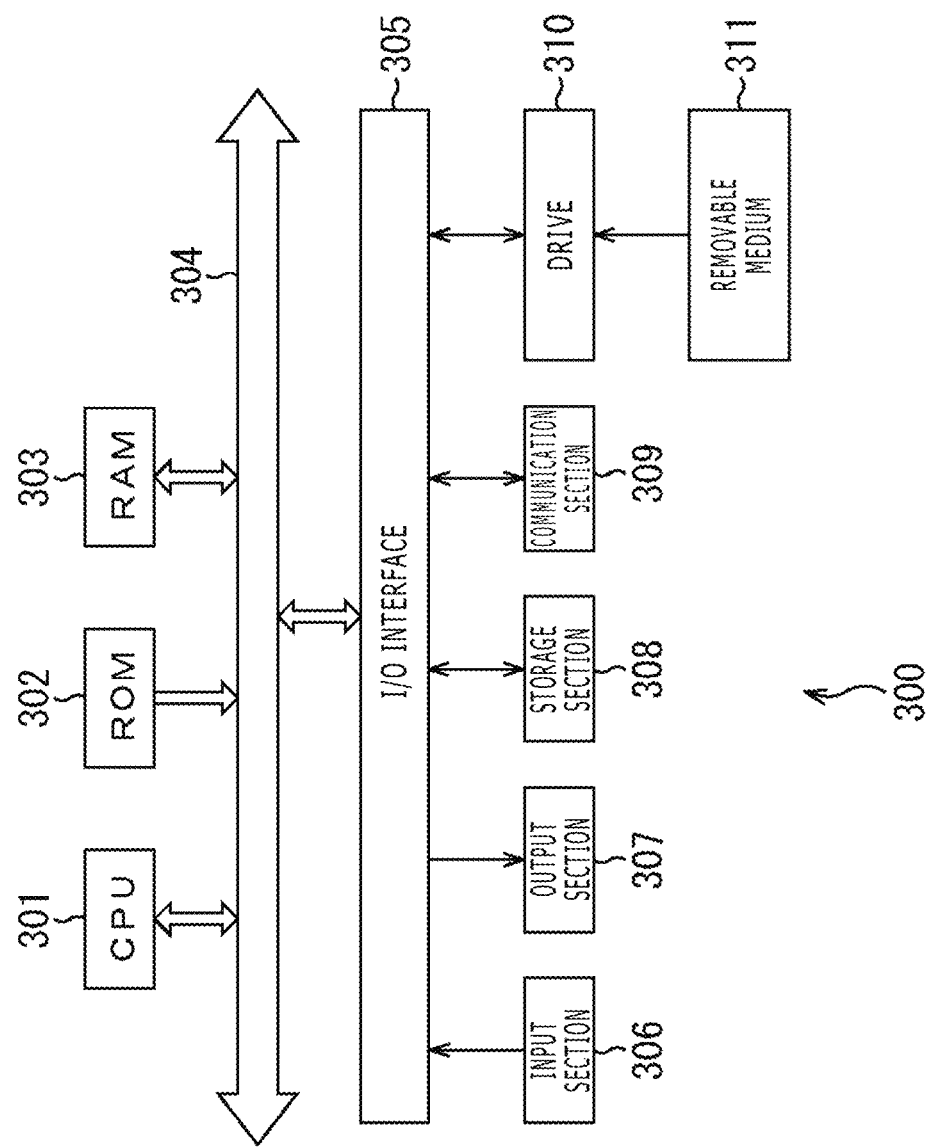
FIG. 15 is a block diagram illustrating a hardware configuration example of a computer.

FIG. 15 is a block diagram illustrating a hardware configuration example of a computer that performs the above series of processes using programs.

In a computer 300, a CPU (Central Processing Unit) 301, a ROM (Read Only Memory) 302, and a RAM (Random Access Memory) 303 are connected to each other by a bus 304.

An I/O interface 305 is further connected to the bus 304. An input section 306, an output section 307, a storage section 308, a communication section 309, and a drive 310 are connected to the I/O interface 305.

The input section 306 includes a keyboard, a mouse, a microphone, and so on. The output section 307 includes a display, a speaker, and so on. The storage section 308 includes a hard disk and a non-volatile memory. The communication section 309 includes a network interface and so on. The drive 310 drives a removable medium 311 such as magnetic disk, optical disc, magneto-optical disk, or semiconductor memory.

In the computer 300 configured as described above, the series of processes described above are performed as the CPU 301 loads, for example, the program stored in the storage section 308 into the RAM 303 via the I/O interface 305 and the bus 304 for execution.

The program executed by the computer 300 (CPU 301) can be provided, for example, recorded on the removable medium 311 as a package media. Alternatively, the program can be provided via a wired or wireless transmission medium such as local area network, the Internet, or digital satellite broadcasting.

In the computer 300, the program can be installed to the storage section 308 via the I/O interface 305 as the removable medium 311 is inserted into the drive 310. Also, the program can be received by the communication section 309 via a wired or wireless transmission media and installed to the storage section 308. In addition to the above, the program can be installed, in advance, to the ROM 302 or the storage section 308.

It should be noted that the program executed by the computer 300 may be a program that performs the processes chronologically according to the sequence described in the present specification, or in parallel, or at a necessary time as when the program is called.

Seventh Embodiment

Description of Vehicle Control System to which Present Disclosure is Applied

FIG. 16 is a block diagram illustrating an example of a schematic configuration of a vehicle control system to which the present disclosure is applied.

A vehicle control system 2000 includes a plurality of electronic control units connected via a communication network 2010. In the example depicted in FIG. 16, the vehicle control system 2000 includes a drive-system control unit 2100, a body-system control unit 2200, a battery control unit 2300, an out-vehicle information detection unit 2400, an in-vehicle information detection unit 2500, and an integrated control unit 2600. A communication network 2010 that connects the plurality of these control units may be a vehicle-mounted communication network such as CAN (Controller Area Network), LIN (Local Interconnect Network), LAN (Local Area Network) and FlexRay (registered trademark) compliant with an arbitrary standard.

Each control unit includes a microcomputer, a storage section, and a drive circuit. The microcomputer handles operations according to a variety of programs. The storage section stores programs executed by the microcomputer or parameters used for various operations, and so on. The drive circuit drives various apparatuses to be controlled. Each control unit includes not only a network I/F for communication with other control units via the communication network 2010 but also a communication I/F for communication with in- and out-vehicle apparatuses or sensors in a wired or wireless fashion. In FIG. 16, a microcomputer 2610, a general-purpose communication I/F 2620, a dedicated communication I/F 2630, a positioning section 2640, a beacon reception section 2650, an in-vehicle apparatus I/F 2660, an audio/image output section 2670, a vehicle-mounted network I/F 2680, and a storage section 2690 are depicted as functional components of the integrated control unit 2600.

Other control units similarly include a microcomputer, a communication I/F, a storage section, and so on.

The drive-system control unit 2100 controls the action of the drive-system apparatuses of the vehicle in accordance with various programs. For example, the drive-system control unit 2100 functions as a control apparatus of a driving force generating apparatus for generating a driving force of a vehicle such as internal combustion engine and drive motor, a driving force transmission mechanism for transmitting a driving force to the wheels, a steering mechanism for adjusting the steering angle of a vehicle, and a braking apparatus for generating a braking force of a vehicle. The drive-system control unit 2100 may also have functions as a control apparatus such as ABS (Antilock Brake System) or an ESC (Electronic Stability Control).

A vehicle state detection section 2110 is connected to the drive-system control unit 2100. The vehicle state detection section 2110 includes, for example, at least one of a gyro sensor for detecting the angular speed of axial rotational motion of a vehicle body, an acceleration sensor for detecting the acceleration of a vehicle, and a sensor for detecting the amount of depression of the accelerator pedal, the amount of depression of the brake pedal, the steering angle of the steering wheel, engine revolutions per minute, wheel rotational speed, and so on. The drive-system control unit 2100 performs operations using signals input from the vehicle state detection section 2110, thereby controlling the internal combustion engine, the drive motor, the electric power steering apparatus, or the brake apparatus.

The body-system control unit 2200 controls the action of various apparatuses provided on the vehicle body in accordance with various programs. For example, the body-system control unit 2200 functions as a control apparatus of a keyless entry system, a smart key system, and a power window apparatus or various lamps such as headlights, rear lights, brake lamp, turn signals, or fog lamp. In this case, radio waves emitted from a portable transmitter that replaces a key or various switch signals can be input to the body-system control unit 2200. The body-system control unit 2200 accepts these radio wave and signal inputs and controls the vehicle's door lock apparatus, power window apparatus, lamps, and so on.

The battery control unit 2300 controls a secondary battery 2310, a power supply source of the drive motor, in accordance with various programs. For example, battery temperature, battery output voltage, remaining battery charge, or other information is input to the battery control unit 2300 from a battery apparatus having the secondary battery 2310. The battery control unit 2300 performs arithmetic processing using these signals, thereby controlling temperature adjustment of the secondary battery 2310, a cooling apparatus provided on the battery apparatus, or other apparatus.

The out-vehicle information detection unit 2400 detects information outside a vehicle equipped with the vehicle control system 2000. For example, at least one of an imaging section 2410 and an out-vehicle information detection section 2420 is connected to the out-vehicle information detection unit 2400. The imaging section 2410 includes at least one of a ToF (Time Of Flight) camera, a stereo camera, a monocular camera, an infrared camera, and other cameras. The out-vehicle information detection section 2420 includes, for example, an environment sensor that detects current weather or climate or a surrounding information detection sensor that detects other vehicles, obstacles, pedestrians, or others around the vehicle equipped with the vehicle control system 2000.

The environment sensor may be, for example, one of a rain drop sensor that detects rainy weather, a fog sensor that detects fog, a sunlight sensor that detects sunlight level, and a snow sensor that detects snowfall. The surrounding information detection sensor may be one of an ultrasonic sensor, a radar apparatus, and an LIDAR (Light Detection and Ranging, Laser Imaging Detection and Ranging) apparatus. These imaging section 2410 and out-vehicle information detection section 2420 may be included as separate sensors or apparatuses or as an integrated apparatus comprised of a plurality of sensors or apparatuses.

Here, FIG. 17 illustrates examples of installation positions of the imaging section 2410 and the out-vehicle information detection section 2420. Imaging sections 2910, 2912, 2914, 2916, and 2918 are provided at least one of a front nose, side mirrors, a rear bumper, a back door, and a top of a front glass in a compartment of a vehicle 2900. The imaging section 2910 provided on the front nose and the imaging section 2918 provided on the top of the front glass in the compartment acquire mainly front images of the vehicle 2900. The imaging sections 2912 and 2914 provided on the side mirrors acquire mainly side images of the vehicle 2900. The imaging section 2916 provided on the rear bumper or the back door acquires mainly a rear image of the vehicle 2900. The imaging section 2918 provided on the top of the front glass in the compartment is used mainly to detect vehicles ahead, pedestrians, obstacles, traffic lights, traffic signs, or driving lanes.

It should be noted that FIG. 17 illustrates examples of imaging ranges of the imaging sections 2910, 2912, 2914, and 2916. An imaging range 'a' depicts the imaging range of the imaging section 2910 provided on the front nose. Imaging ranges 'b' and 'c' depict the imaging ranges of the imaging sections 2912 and 2914 provided on the side mirrors. An imaging range 'd' depicts the imaging range of the imaging section 2916 provided on the rear bumper or the back door. For example, superimposing image data, captured by the imaging sections 2910, 2912, 2914, and 2916, one on top of the other, provides a bird's eye view image as seen from above the vehicle 2900.

Out-vehicle information detection sections 2920, 2922, 2924, 2926, 2928, and 2930 provided on the front, the rear, the sides, corners, and on the top of the front glass in the compartment of the vehicle 2900 may be, for example, ultrasonic sensors or radar apparatuses. The out-vehicle information detection sections 2920, 2926, and 2930 provided on the front nose, the rear bumper, the back door, and on the top of the front glass in the compartment of the vehicle 2900 may be, for example, LIDAR apparatuses. These out-vehicle information detection sections 2920 to 2930 are used mainly to detect vehicles ahead, pedestrians, obstacles, or others.

A description will continue with reference back to FIG. 16. The out-vehicle information detection unit 2400 causes the imaging section 2410 to capture images outside the vehicle and receives captured image data. Also, the out-vehicle information detection unit 2400 receives detection information from the connected out-vehicle information detection section 2420. In a case where the out-vehicle information detection section 2420 is an ultrasonic sensor, a radar apparatus, or an LIDAR apparatus, the out-vehicle information detection unit 2400 causes an ultrasonic wave, an electromagnetic wave, or other wave to be emitted and receives information about a received reflected wave. The out-vehicle information detection unit 2400 may perform an object detection process for detecting persons, vehicles, obstacles, signs, characters on the road, or others or a distance detection process on the basis of the received information. The out-vehicle information detection unit 2400 may perform an environment recognition process for detecting rainfall, fog, road surface condition or others on the basis of the received information. The out-vehicle information detection unit 2400 may calculate a distance to an object outside the vehicle on the basis of the received information.

Also, the out-vehicle information detection unit 2400 may perform an image recognition process for recognizing persons, vehicles, obstacles, signs, characters on the road, or others or a distance detection process on the basis of the received information. The out-vehicle information detection unit 2400 may generate a bird's eye view image or a panoramic image by performing distortion correction, position alignment, or other process on the received image data and combining the data with image data captured by the different imaging section 2410. The out-vehicle information detection unit 2400 may perform a viewpoint conversion process using image data captured by the different imaging section 2410.

The in-vehicle information detection unit 2500 detects in-vehicle information. For example, a driver state detection section 2510 that detects the driver's state is connected to the in-vehicle information detection unit 2500. The driver state detection section 2510 may be a camera that images the driver, a biological sensor that detects biological information of the driver, a microphone that collects audio in the compartment, or other apparatus. A biological sensor is provided, for example, on a seat surface, the steering wheel, or other location to detect biological information of a passenger sitting on the seat or the driver holding the steering wheel. The in-vehicle information detection unit 2500 may calculate fatigue level or concentration level of the driver on the basis of detection information input from the driver state detection section 2510. Whether the driver is drowsing may be decided. The in-vehicle information detection unit 2500 may subject a collected audio signal to a noise canceling process or other process.

The integrated control unit 2600 controls the actions within the vehicle control system 2000 as a whole in accordance with various programs. An input section 2800 is connected to the integrated control unit 2600. The input section 2800 is realized, for example, by a touch panel, buttons, a microphone, switches, levers, or others on which input operation can be made. The input section 2800 may be, for example, a remote control apparatus on the basis of infrared radiation or other radio waves or an external connection apparatus such as mobile phone, PDA (Personal Digital Assistant), or others capable of manipulating the vehicle control system 2000. The input section 2800 may be, for example, a camera, and in this case, a passenger can input information by gesture. Further, the input section 2800 may include an input control circuit that generates an input signal on the basis of the above information input by a passenger or others by using the input section 2800 and outputs the input signal to the integrated control unit 2600. Passengers and so on operate the input section 2800 to input various data to the vehicle control system 2000 and instruct the vehicle control system 2000 to process data.

The storage section 2690 may include a RAM (Random Access Memory) that stores various programs executed by a microcomputer and a ROM (Read Only Memory) that stores various parameters, operation results, sensor values, and other data. Also, the storage section 2690 may be realized by a magnetic storage device such as HDD (Hard Disc Drive), semiconductor storage device, optical storage device, magneto-optical storage device, or other device.

The general-purpose communication I/F 2620 is a general-purpose communication interface that intermediates communication with various apparatuses existing in an outside environment 2750. A cellular communication protocol such as GSM (registered trademark) (Global System of Mobile communications), WiMAX, LTE (Long Term Evolution), or LTE-A (LTE-Advanced) or other wireless communication protocol such as wireless LAN (also referred to as Wi-Fi (registered trademark)) may be implemented in the general-purpose communication I/F 2620. The general-purpose communication I/F 2620 may connect, for example, to an apparatus (e.g., application server or control server) existing on an external network (e.g., Internet, cloud network, or carrier's own network) via a base station and an access point. Also, the general-purpose communication I/F 2620 may connect to a terminal existing near the vehicle (e.g., pedestrian's or shop's terminal or MTC (Machine Type Communication) terminal) by using, for example, P2P (Peer To Peer) technology.

The dedicated communication I/F 2630 is a communication protocol that supports a communication protocol developed to be used in vehicles. A standard protocol such as WAVE (Wireless Access in Vehicle Environment), a combination of IEEE802.11p, a lower layer, and IEEE1609, an upper layer, or DSRC (Dedicated Short Range Communications), for example, may be implemented in the dedicated communication I/F 2630. The dedicated communication I/F 2630 typically carries out V2X communication, a concept that includes one or more of vehicle to vehicle communication, vehicle to infrastructure communication, and vehicle to pedestrian communication.

The positioning section 2640 carries out positioning by receiving a GNSS signal (e.g., GPS signal from GPS (Global Positioning System) satellite) from a GNSS (Global Navigation Satellite System) satellite and generates position information including longitude, latitude, and altitude of the vehicle. It should be noted that the positioning section 2640 may identify the current position by exchanging signals with wireless access points or acquire position information from a terminal such as mobile phone, PHS, or smartphone.

The beacon reception section 2650 acquires current position, traffic jams, road closures, required time, or other information by receiving radio waves or electromagnetic waves emitted from wireless stations or other apparatuses installed on roads. It should be noted that the functions of the beacon reception section 2650 may be included in the dedicated communication I/F 2630.

The in-vehicle apparatus I/F 2660 is a communication interface that intermediates communication between the microcomputer 2610 and various pieces of equipment existing in the vehicle. The in-vehicle apparatus I/F 2660 may establish wireless connection by using a wireless communication protocol such as wireless LAN, Bluetooth (registered trademark), NFC (Near Field Communication), or WUSB (Wireless USB). Also, the in-vehicle apparatus I/F 2660 may establish wired connection by using a connection terminal which is not depicted (and a cable if required). The in-vehicle apparatus I/F 2660 exchanges control signals or data signals, for example, with a mobile apparatus or a wearable apparatus of a passenger, or an information apparatus carried into or installed in the vehicle.

The vehicle-mounted network I/F 2680 is an interface that intermediates communication between the microcomputer 2610 and the communication network 2010. The vehicle-mounted network I/F 2680 sends and receives signals and others according to a given protocol supported by the communication network 2010.

The microcomputer 2610 of the integrated control unit 2600 controls the vehicle control system 2000 in accordance with various programs based on information acquired via at least one of the general-purpose communication I/F 2620, the dedicated communication I/F 2630, the positioning section 2640, the beacon reception section 2650, the in-vehicle apparatus I/F 2660, and the vehicle-mounted network I/F 2680. For example, the microcomputer 2610 may calculate a control target value of the driving force generating apparatus, the steering mechanism, or the brake apparatus on the basis of in-vehicle and out-vehicle information acquired and output a control command to the drive-system control unit 2100. For example, the microcomputer 2610 may perform cooperative control for vehicle collision avoidance, or impact alleviation, follow-up traveling on the basis of vehicle-to-vehicle distance, constant vehicle speed traveling, autonomous driving, and so on.

The microcomputer 2610 may create local map information including information around the current position of the vehicle on the basis of information acquired via at least one of the general-purpose communication I/F 2620, the dedicated communication I/F 2630, the positioning section 2640, the beacon reception section 2650, the in-vehicle apparatus I/F 2660, and the vehicle-mounted network I/F 2680. Also, the microcomputer 2610 may predict risks such as collision of the vehicle, approaching pedestrian, and entry into a closed road and generate a warning signal. A warning signal may be a signal that causes a warning tone to be produced or a warning lamp to be lit.

The audio/image output section 2670 sends at least either an audio or image output signal to an output apparatus that is capable of visually or auditorily notifying information to the vehicle's passenger or outside of the vehicle. In the example depicted in FIG. 16, an audio speaker 2710, a display section 2720, and an instrument panel 2730 are depicted as output apparatuses. The display section 2720 may include, for example, at least one of an on-board display and a head-up display. The display section 2720 may include an AR (Augmented Reality) display function. The output apparatus may be an apparatus other than the above such as headphone, projector, or lamp. In a case where the output apparatus is a display apparatus, the display apparatus visually displays results obtained by various processes performed by the microcomputer 2610 or information received from other control units in various forms such as text, image, table, and graph. Also, in a case where the output apparatus is an audio output apparatus, the audio output apparatus converts an audio signal made up of audio data, acoustic data, or other data into an analog signal and auditorily outputs the analog signal.

It should be noted that, in the example depicted in FIG. 16, at least two control units connected via the communication network 2010 may be combined into a single control unit. Alternatively, each control unit may include a plurality of control units. Further, the vehicle control system 2000 may include a separate control unit that is not depicted. Also, in the description given above, some or all of the functions assumed by any of the control units may be assumed by other control unit. That is, as long as information is sent and received via the communication network 2010, given arithmetic processing may be performed by one of the control units. Similarly, a sensor or apparatus connected to one of the control units may be connected to other control unit so that the plurality of control units mutually send and receive detection information via the communication network 2010.

In the motor vehicle control system 2000 configured as described above, the functions of the image processing apparatus of the present application are provided in the integrated control unit 2600. It should be noted that at least some of the functions of the image processing apparatus of the present application may be realized by a module for the integrated control unit 2600 (e.g., integrated circuit module configured on a single die). Also, the image processing apparatus of the present application may be realized by a plurality of control units.

In the present specification, a system refers to a set of a plurality of components (e.g., apparatuses, modules (parts)), and it does not matter whether or not all the components are accommodated in the same housing. Therefore, a plurality of apparatuses accommodated in different housings and connected via a network and a single apparatus having a plurality of modules accommodated in a single housing are both systems.

It should be noted that the effect described in the present specification is merely illustrative and is not limited and that there may be additional effects.

Also, embodiments of the present disclosure are not limited to those described above and can be modified in various ways without departing from the gist of the present disclosure.

For example, the number and arrangement of cameras (imaging sections) making up the vehicle-mounted camera system (vehicle control system) are not limited to the number and arrangement described above. Also, the present technology is also applicable to vehicle-mounted camera systems mounted not only to motor vehicles but also vehicles including electric vehicles, hybrid electric vehicles, and motorcycles.

Also, a method of estimating a 3D position and orientation of a known object is not limited to that described above. Further, cameras may be calibrated on the basis only on a 3D position of a known object.

It should be noted that the present disclosure can have the following configurations:

(1)

An image processing apparatus including:

an estimation section configured to estimate a three dimensional position of a known object included in each of images captured by a plurality of imaging sections with respect to each of the imaging sections;

a recognition section configured to recognize a positional relationship between the plurality of imaging sections on the basis of the three dimensional position of the known object with respect to each of the imaging sections estimated by the estimation section; and a correction section configured to correct the images captured by the plurality of imaging sections on the basis of the positional relationship recognized by the recognition section.

(2)

The image processing apparatus of feature (1), in which the estimation section estimates the three dimensional position and orientation of the known object with respect to each of the imaging sections, the recognition section recognizes a relationship between positions and orientations of the plurality of imaging sections on the basis of the three dimensional position and orientation of the known object with respect to each of the imaging sections estimated by the estimation section, and the correction section corrects the images on the basis of the relationship between positions and orientations recognized by the recognition section.

(3)

The image processing apparatus of feature (1), in which the estimation section estimates, for each imaging section, the three dimensional position of the known object with respect to the imaging section on the basis of a feature point position of the known object on the image and a parameter of the imaging section.

(4)

The image processing apparatus of feature (1) or (3), in which there are the plurality of known objects, and the recognition section recognizes a positional relationship between the plurality of imaging sections on the basis of estimation accuracy with which the three dimensional position of each of the known objects is estimated by the estimation section and the three dimensional position of each of the known objects.

(5)

The image processing apparatus of any one of features (1) to (4), in which the plurality of imaging sections are mounted to a vehicle, and the known object is an object on a road or an object possessed by the vehicle.

(6)

An image processing method, by an image processing apparatus, including:

an estimation step of estimating a three dimensional position of a known object included in each of images captured by a plurality of imaging sections with respect to each of the imaging sections;

a recognition step of recognizing a positional relationship between the plurality of imaging sections on the basis of the three dimensional position of the known object with respect to each of the imaging sections estimated by a process of the estimation step; and a correction step of correcting the images captured by the plurality of imaging sections on the basis of the positional relationship recognized by a process of the recognition step.

(7)

A program causing a computer to function as:

an estimation section configured to estimate a three dimensional position of a known object included in each of images captured by a plurality of imaging sections with respect to each of the imaging sections;

a recognition section configured to recognize a positional relationship between the plurality of imaging sections on the basis of the three dimensional position of the known object with respect to each of the imaging sections estimated by the estimation section; and a correction section configured to correct the images captured by the plurality of imaging sections on the basis of the positional relationship recognized by the recognition section.

REFERENCE SIGNS LIST

11 Vehicle, 12, 13 Camera, 21 Road sign, 40 Image processing apparatus, 41 Amount-of-travel estimation section, 42 Decision section, 43 Amount-of-travel estimation section, 44 Decision section, 45 Position detection section, 46 Correction section, 64 Parallax detection section, 65 Position calculation section, 83, 86 Estimation section, 87 Recognition section, 111 Number plate, 123, 126 Estimation section, 127 Recognition section, 141 Camera, 161, 162 Camera, 180 Image processing apparatus, 182 Decision section, 191, 192 Movement parallax estimation section, 193 Stereo parallax estimation section

The invention claimed is:

1. An image processing apparatus comprising:
a processor and a memory containing instructions that, when executed by the processor, are configured to:
detect stereo parallax of at least one feature point from feature point information derived from images captured by at least two cameras;
calculate a position of the at least one feature point in three dimensional space based on the detected stereo parallax;
estimate a travel of the cameras based on the calculated position of the at least one feature point and information of a past position of the at least one feature point;
decide to calibrate the cameras based on the estimated travel;
estimate a three dimensional position of each of a plurality of known objects, of which size and shape are known, included in each of images captured by the cameras with respect to each of the cameras, based at least in part on stored feature quantities of the plurality of known objects;
recognize a positional relationship between the cameras on the basis of estimation accuracy with which the three dimensional position of each of the known objects is estimated and on the basis of the three dimensional position of each of the known objects with respect to each of the cameras; and
correct the images captured by the cameras on the basis of the recognized positional relationship between the cameras.

2. The image processing apparatus of claim 1, wherein the instructions are configured to:
estimate the three dimensional position and orientation of each of the known objects with respect to each of the cameras,
recognize a relationship between positions and orientations of the cameras on the basis of the three dimensional position and orientation of each of the known objects with respect to each of the cameras, and
correct the images on the basis of the relationship between the positions and the orientations.

3. The image processing apparatus of claim 1, wherein the instructions are configured to:
estimate, for each camera, the three dimensional position of the known object with respect to the camera on the basis of a feature point position of the known object on the image and a parameter of the camera.

4. The image processing apparatus of claim 1, wherein the cameras are mounted to a vehicle, and
the known object is an object on a road or an object possessed by the vehicle.

5. An image processing method, by an image processing apparatus, comprising:
detecting stereo parallax of at least one feature point from feature point information derived from images captured by at least two cameras;
calculating a position of the at least one feature point in three dimensional space based on the detected stereo parallax;
estimating a travel of the cameras based on the calculated position of the at least one feature point and information of a past position of the at least one feature point;
deciding to calibrate the cameras based on the estimated travel;
estimating a three dimensional position of each of known objects, of which size and shape are known, included in each of images captured by a plurality of the cameras with respect to each of the cameras, based at least in part on stored feature quantities of the plurality of known objects;
recognizing a positional relationship between the cameras on the basis of estimation accuracy with which the three dimensional position of each of the known objects is estimated and on the basis of the estimated three dimensional position of each of the known objects with respect to each of the cameras; and
correcting the images captured by the cameras on the basis of the recognized positional relationship between the cameras.

6. A non-transitory, computer-readable medium containing instructions that, when executed by a processing device, perform an image processing method comprising:
detecting stereo parallax of at least one feature point from feature point information derived from images captured by at least two cameras;
calculating a position of the at least one feature point in three dimensional space based on the detected stereo parallax;
estimating a travel of the cameras based on the calculated position of the at least one feature point and information of a past position of the at least one feature point;
deciding to calibrate the cameras based on the estimated travel;
estimating a three dimensional position of each of a plurality of known objects, of which size and shape are known, included in each of images captured by the cameras with respect to each of the cameras, based at least in part on stored feature quantities of the plurality of known objects;
recognizing a positional relationship between the cameras on the basis of estimation accuracy with which the three dimensional position of each of the known objects is estimated and on the basis of the three dimensional position of each of the known objects with respect to each of the cameras; and
correcting the images captured by the cameras on the basis of the recognized positional relationship between the cameras.

* * * * *